US011310834B2

United States Patent
Lei et al.

(10) Patent No.: US 11,310,834 B2
(45) Date of Patent: Apr. 19, 2022

(54) PRIORITY HANDLING FOR A RANDOM ACCESS MESSAGE THAT INCLUDES A PREAMBLE AND A PAYLOAD

(71) Applicant: QUALCOMM Incorporated, San Diego, CA (US)

(72) Inventors: Jing Lei, San Diego, CA (US); Wanshi Chen, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 16/803,583

(22) Filed: Feb. 27, 2020

(65) Prior Publication Data
US 2020/0305201 A1 Sep. 24, 2020

Related U.S. Application Data

(60) Provisional application No. 62/820,075, filed on Mar. 18, 2019.

(51) Int. Cl.
*H04W 74/08* (2009.01)
*H04W 72/04* (2009.01)
(Continued)

(52) U.S. Cl.
CPC ....... *H04W 74/0833* (2013.01); *H04L 5/0051* (2013.01); *H04L 25/0226* (2013.01);
(Continued)

(58) Field of Classification Search
None
See application file for complete search history.

(56) References Cited

U.S. PATENT DOCUMENTS

| 10,880,895 B2* | 12/2020 | Gordaychik | H04W 8/22 |
| 2013/0195048 A1* | 8/2013 | Ekpenyong | H04W 52/325 370/329 |

(Continued)

FOREIGN PATENT DOCUMENTS

WO 2007060749 A1 5/2007

OTHER PUBLICATIONS

ALCATEL: "Preamble Transmission Power Level", IEEE Draft, BRAN24.5D030. IEEE-SA,Piscataway, NJ USA, vol. 802.11 ETSI BRAN, Sep. 12, 2002 (Sep. 12, 2002), pp. 1-11. XP068141887, Retrieved from the Internet: URL: www.ieee802.org/11/private/ETSI_documents/BRAN.bak/Docfile/BRAN18-28/BRAN24_5/BRAN24.5d030.doc [retrieved on Sep. 12, 2002], p. 11.
(Continued)

*Primary Examiner* — Jutai Kao
(74) *Attorney, Agent, or Firm* — Harrity & Harrity, LLP \ Qualcomm

(57) ABSTRACT

This disclosure provides systems, methods and apparatus for assisting a user equipment (UE) with balancing quality of service (QoS) requirements (such as access latency or reliability requirements) and consumption of high priority network resources (such as for load balancing) when transmitting a random access message (RAM) in a two-step random access channel (RACH) procedure. As a result, the UE may be capable of satisfying QoS requirements for the RAM while reducing an impact of transmission of the RAM on other uplink transmissions. Furthermore, some techniques and apparatuses described herein assist a UE with prioritizing portions of the RAM in different UE operating modes, such as a dual connectivity mode, a carrier aggregation mode, or a supplemental uplink mode. Some techniques and apparatuses described herein employ cross-carrier schedul-
(Continued)

ing, dynamic power sharing, or dynamic power control to achieve these and other performance improvements.

30 Claims, 9 Drawing Sheets

(51) Int. Cl.
*H04W 52/24* (2009.01)
*H04W 52/26* (2009.01)
*H04L 5/00* (2006.01)
*H04L 25/02* (2006.01)

(52) U.S. Cl.
CPC ....... *H04W 52/242* (2013.01); *H04W 52/265* (2013.01); *H04W 72/0413* (2013.01); *H04W 72/0473* (2013.01)

(56) References Cited

U.S. PATENT DOCUMENTS

| | | | |
|---|---|---|---|
| 2013/0272231 A1* | 10/2013 | Dinan | H04W 52/34 370/329 |
| 2013/0322383 A1 | 12/2013 | Dinan | |
| 2018/0279376 A1 | 9/2018 | Dinan et al. | |
| 2019/0053080 A1* | 2/2019 | Ryu | H04L 5/0048 |
| 2019/0306806 A1* | 10/2019 | Sood | H04W 52/36 |
| 2019/0387548 A1* | 12/2019 | Kim | H04W 76/11 |
| 2020/0037297 A1* | 1/2020 | Pan | H04W 72/044 |
| 2020/0100299 A1* | 3/2020 | Loehr | H04W 76/11 |
| 2020/0107277 A1* | 4/2020 | Jeon | H04W 52/228 |

OTHER PUBLICATIONS

N/A: "PHY Minutes 28feb07; 22-07-0078-00-0000-phy-minutes-28feb07", IEEE Draft, 22-07-0078-00-0000-PHY-MINUTES-28FEB07, IEEE-SA Mentor, Piscataway, NJ USA, vol. 802.22, Apr. 3, 2007 (Apr. 3, 2007), pp. 1-3, XP017657769, [retrieved on Apr. 3, 2007], p. 3, lines 1-9.
Partial International Search Report—PCT/US2020/020457—ISA/EPO—dated May 26, 2020.
3GPP TS 38.321, "3rd Generation Partnership Project; Technical Specification Group Radio Access Network; NR; Medium Access Control (MAC) Protocol Specification (Release 15)", 3GPP Standard, Technical Specification, 3GPP TS 38.321, V15.4.0, 3RD Generation Partnership Project (3GPP). Mobile Competence Centre, 650. Route Des Lucioles, F-06921, Sophia-Antipolis Cedex, France, vol. RAN WG2, No. V15.4.0, Dec. 2018, Jan. 11, 2019 (Jan. 11, 2019), pp. 1-77, XP051591686, [retrieved on Jan. 11, 2019] Section 5.1, p. 13-p. 22, Section 6.1.5, p. 69-p. 70, Para. 5.18.8 and Para. 6.1.3.18.
"3rd Generation Partnership Project; Technical Specification Group Radio Access Network; NR; Physical layer procedures for control (Release 15)", 3GPP TS 38.213 V15.4.0, Dec. 2018, 104 Pages.
Nokia, et al., "On 2-Step RACH Procedure", 3GPP Draft, R1-1902136, 3GPP TSG RAN WG1 #96, On 2-step RACH Procedure, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 15, 2019 (Feb. 15, 2019), XP051599831, 10 pages, Retrieved from the Internet: URL: http://www.3gpp.org/ftp/tsg%5Fran/WG1%5FRL1/TSGR1%5F96/Docs/R1%2D1902136%2Ezip. [retrieved on Feb. 15, 2019] p. 2; figure 2 p. 2, paragraph 2.2-p. 3, paragraph 2.3.
International Search Report and Written Opinion—PCT/US2020/020457—ISA/EPO—dated Aug. 31, 2020.
Qualcomm Incorporated: "Channel Structure for Two-Step RACH", 3GPP Draft, 3GPP TSG-RAN WG1 Meeting #96, R1-1902977, Channel Structure for Two-Step RACH, 3rd Generation Partnership Project (3GPP), Mobile Competence Centre, 650, Route Des Lucioles, F-06921, Sophia-Antipolis Cedex, France, vol. RAN WG1, No. Athens, Greece; Feb. 25, 2019-Mar. 1, 2019, Feb. 16, 2019 (Feb. 16, 2019), XP051600674,10 pages, Retrieved from the Internet: URL: http://www.3gpp.org/ftp/tsg%5Fran/WG1%5FRL1/TSGR1%5F96/Docs/R1%2D1902977%2Ezip, retrieved on Feb. 16, 2019.

\* cited by examiner

PRIORITY HANDLING FOR A RANDOM ACCESS MESSAGE THAT INCLUDES A PREAMBLE AND A PAYLOAD

CROSS-REFERENCE TO RELATED APPLICATION

This Patent Application claims priority to U.S. Provisional Patent Application No. 62/820,075, filed on Mar. 18, 2019, entitled "PRIORITY HANDLING FOR A RANDOM ACCESS MESSAGE THAT INCLUDES A PREAMBLE AND A PAYLOAD," and assigned to the assignee hereof. The disclosure of the prior Application is considered part of and is incorporated by reference in this Patent Application.

TECHNICAL FIELD

Aspects of the present disclosure relate generally to wireless communication and to techniques for priority handling a random access message that includes a preamble and a payload.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink (DL) and uplink (UL). The DL (or forward link) refers to the communication link from the BS to the UE, and the UL (or reverse link) refers to the communication link from the UE to the BS. As will be described in more detail herein, a BS may be referred to as a NodeB, an LTE evolved nodeB (eNB), a gNB, an access point (AP), a radio head, a transmit receive point (TRP), a New Radio (NR) BS, a 5G NodeB, or the like.

The above multiple access technologies have been adopted in various telecommunication standards to provide a common protocol that enables different UEs to communicate on a municipal, national, regional, and even global level. NR, which also may be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using OFDM with a cyclic prefix (CP) (CP-OFDM) on the DL, using CP-OFDM or SC-FDM (for example, also known as discrete Fourier transform spread OFDM (DFT-s-OFDM)) on the UL (or a combination thereof), as well as supporting beamforming, multiple-input multiple-output (MIMO) antenna technology, and carrier aggregation.

SUMMARY

The systems, methods and devices of this disclosure each have several innovative aspects, no single one of which is solely responsible for the desirable attributes disclosed herein.

One innovative aspect of the subject matter described in this disclosure can be implemented in a method of wireless communication performed by a user equipment (UE). The method may include determining a first transmit power for transmission of a preamble of a random access message based at least in part on a first set of parameters; determining a second transmit power for transmission of a payload of the random access message based at least in part on a second set of parameters, where the random access message includes both the preamble and the payload; transmitting the preamble using the first transmit power; and transmitting the payload using the second transmit power.

In some aspects, the first set of parameters is different from the second set of parameters. In some aspects, the first set of parameters includes at least one of: a transmission occasion in which the preamble is to be transmitted, a carrier to be used to transmit the preamble, a pathloss measurement for the carrier to be used to transmit the preamble, a transmission bandwidth assigned for transmission of the preamble, a power spectral density target for transmission of the preamble, a pathloss compensation factor for transmission of the preamble, or a combination thereof. In some aspects, the second set of parameters includes at least one of: a transmission occasion in which the payload is to be transmitted, a carrier to be used to transmit the payload, a pathloss measurement for the carrier to be used to transmit the payload, a transmission bandwidth assigned for transmission of the payload, a power spectral density target for transmission of the payload, a pathloss compensation factor for transmission of the payload, or a combination thereof.

In some aspects, at least one of the first transmit power or the second transmit power is higher than a transmit power used for other uplink transmissions that overlap with the preamble or the payload of the random access message. In some aspects, the other uplink transmissions include at least one of a sounding reference signal (SRS), a physical uplink control channel (PUCCH) communication, or a physical uplink shared channel (PUSCH) transmission. In some aspects, the first transmit power is higher than the second transmit power.

Another innovative aspect of the subject matter described in this disclosure can be implemented in a UE for wireless communication. The UE may include memory and one or more processors operatively coupled to the memory. The memory and the one or more processors may be configured to determine a first transmit power for transmission of a preamble of a random access message based at least in part on a first set of parameters; determine a second transmit power for transmission of a payload of the random access message based at least in part on a second set of parameters, where the random access message includes both the preamble and the payload; transmit the preamble using the first transmit power; and transmit the payload using the second transmit power.

In some aspects, the first set of parameters is different from the second set of parameters. In some aspects, the first set of parameters includes at least one of: a transmission occasion in which the preamble is to be transmitted, a carrier to be used to transmit the preamble, a pathloss measurement for the carrier to be used to transmit the preamble, a transmission bandwidth assigned for transmission of the preamble, a power spectral density target for transmission of the preamble, a pathloss compensation factor for transmission of the preamble, or a combination thereof. In some aspects, the second set of parameters includes at least one of: a transmission occasion in which the payload is to be transmitted, a carrier to be used to transmit the payload, a pathloss measurement for the carrier to be used to transmit the payload, a transmission bandwidth assigned for transmission of the payload, a power spectral density target for transmission of the payload, a pathloss compensation factor for transmission of the payload, or a combination thereof.

In some aspects, at least one of the first transmit power or the second transmit power is higher than a transmit power used for other uplink transmissions that overlap with the preamble or the payload of the random access message. In some aspects, the other uplink transmissions include at least one of a sounding reference signal (SRS), a physical uplink control channel (PUCCH) communication, or a physical uplink shared channel (PUSCH) transmission. In some aspects, the first transmit power is higher than the second transmit power.

Yet another innovative aspect of the subject matter described in this disclosure can be implemented in a non-transitory computer-readable medium storing one or more instructions for wireless communication. The one or more instructions, when executed by one or more processors of a UE, may cause the one or more processors to determine a first transmit power for transmission of a preamble of a random access message based at least in part on a first set of parameters; determine a second transmit power for transmission of a payload of the random access message based at least in part on a second set of parameters, where the random access message includes both the preamble and the payload; transmit the preamble using the first transmit power; and transmit the payload using the second transmit power.

In some aspects, the first set of parameters is different from the second set of parameters. In some aspects, the first set of parameters includes at least one of: a transmission occasion in which the preamble is to be transmitted, a carrier to be used to transmit the preamble, a pathloss measurement for the carrier to be used to transmit the preamble, a transmission bandwidth assigned for transmission of the preamble, a power spectral density target for transmission of the preamble, a pathloss compensation factor for transmission of the preamble, or a combination thereof. In some aspects, the second set of parameters includes at least one of: a transmission occasion in which the payload is to be transmitted, a carrier to be used to transmit the payload, a pathloss measurement for the carrier to be used to transmit the payload, a transmission bandwidth assigned for transmission of the payload, a power spectral density target for transmission of the payload, a pathloss compensation factor for transmission of the payload, or a combination thereof.

In some aspects, at least one of the first transmit power or the second transmit power is higher than a transmit power used for other uplink transmissions that overlap with the preamble or the payload of the random access message. In some aspects, the other uplink transmissions include at least one of a sounding reference signal (SRS), a physical uplink control channel (PUCCH) communication, or a physical uplink shared channel (PUSCH) transmission. In some aspects, the first transmit power is higher than the second transmit power.

Still another innovative aspect of the subject matter described in this disclosure can be implemented in an apparatus for wireless communication. The apparatus may include means for determining a first transmit power for transmission of a preamble of a random access message based at least in part on a first set of parameters; means for determining a second transmit power for transmission of a payload of the random access message based at least in part on a second set of parameters, where the random access message includes both the preamble and the payload; means for transmitting the preamble using the first transmit power; and means for transmitting the payload using the second transmit power.

In some aspects, the first set of parameters is different from the second set of parameters. In some aspects, the first set of parameters includes at least one of: a transmission occasion in which the preamble is to be transmitted, a carrier to be used to transmit the preamble, a pathloss measurement for the carrier to be used to transmit the preamble, a transmission bandwidth assigned for transmission of the preamble, a power spectral density target for transmission of the preamble, a pathloss compensation factor for transmission of the preamble, or a combination thereof. In some aspects, the second set of parameters includes at least one of: a transmission occasion in which the payload is to be transmitted, a carrier to be used to transmit the payload, a pathloss measurement for the carrier to be used to transmit the payload, a transmission bandwidth assigned for transmission of the payload, a power spectral density target for transmission of the payload, a pathloss compensation factor for transmission of the payload, or a combination thereof.

In some aspects, at least one of the first transmit power or the second transmit power is higher than a transmit power used for other uplink transmissions that overlap with the preamble or the payload of the random access message. In some aspects, the other uplink transmissions include at least one of a sounding reference signal (SRS), a physical uplink control channel (PUCCH) communication, or a physical uplink shared channel (PUSCH) transmission. In some aspects, the first transmit power is higher than the second transmit power.

Another innovative aspect of the subject matter described in this disclosure can be implemented in a method of wireless communication performed by a user equipment (UE). The method may include determining a quality of service (QoS) requirement associated with a payload of a random access message, where the random access message includes a preamble and the payload; and transmitting the preamble and the payload based on a priority that is determined using the QoS requirement.

In some aspects, the priority is determined based on a determination that the UE is operating in a carrier aggregation mode, a dual connectivity mode, or a supplemental uplink mode. In some aspects, the priority relates to multiple cell groups, multiple frequency ranges, or multiple component carriers with which the UE is configured to operate. In some aspects, the priority indicates at least one of: a cell group on which at least one of the preamble or the payload is to be transmitted, a component carrier on which at least one of the preamble or the payload is to be transmitted, a transmission power with which at least one of the preamble or the payload is to be transmitted, or a combination thereof.

In some aspects, the preamble and the payload are transmitted using a same cell group based on a determination that the QoS requirement satisfies a threshold. In some aspects, the threshold is based on at least one of a collision probability of random selection of preamble or demodulation reference signal (DMRS) sequences, available transmission occasions on different uplink carriers, one or more channel quality measurements, one or more interference measurements, or a combination thereof. In some aspects, the preamble and the payload are transmitted using different cell groups based on a determination that the QoS requirement does not satisfy a threshold.

In some aspects, the priority is determined based on whether the random access message is to be transmitted as an initial transmission or a re-transmission. In some aspects, the priority is determined based on a determination that the UE is configured with a first cell group that uses a first frequency range and is configured with a second cell group that uses a second frequency range. In some aspects, the first frequency range is a sub-6 gigahertz frequency range and the second frequency range is at least one of a millimeter wave frequency range, a different carrier frequency within the sub-6 gigahertz frequency range that has a different pathloss than the first frequency range, or an unlicensed spectrum frequency range. In some aspects, the preamble and the payload are transmitted using the first cell group based on a determination that the QoS requirement satisfies a threshold. In some aspects, the preamble is transmitted using the first cell group and the payload is transmitted using the second cell group based on a determination that the QoS requirement does not satisfy a threshold. In some aspects, the preamble and the payload are transmitted using a different cell group for a first transmission occasion and are transmitted using a same cell group for a second transmission occasion.

In some aspects, the priority is determined based on a determination that the UE is configured with a first cell group having a higher density of transmission occasions or a higher peak power constraint and a second cell group having a lower density of transmission occasions or a lower peak power constraint. In some aspects, the first cell group and the second cell group use a same frequency range. In some aspects, the preamble and the payload are transmitted using the first cell group based on a determination that the QoS requirement satisfies a threshold. is the preamble is transmitted using the first cell group and the payload is transmitted using the second cell group based on a determination that the QoS requirement does not satisfy a threshold.

In some aspects, the preamble and the payload are transmitted using a same transmit power based on a determination that the QoS requirement satisfies a threshold. In some aspects, the same transmit power is higher than a transmit power used for other uplink transmissions that overlap with the preamble or the payload of the random access message. In some aspects, the preamble and the payload are transmitted using different transmit powers based on a determination that the QoS requirement does not satisfy a threshold. In some aspects, the threshold is based on at least one of a collision probability of random selection of preamble or DMRS sequences, available transmission occasions on different uplink carriers, one or more channel quality measurements, one or more interference measurements, or a combination thereof. In some aspects, a first transmit power used for the preamble is higher than a second transmit power used for the payload and is higher than a transmit power used for other uplink transmissions that overlap with the preamble of the random access message.

In some aspects, the UE is configured to disable uplink transmissions that overlap with the preamble or the payload of the random access message. In some aspects, the uplink transmissions are disabled on one or more carriers that are not configured with transmission occasions for the random access message. In some aspects, uplink control information for the disabled uplink transmissions is multiplexed with the payload of the random access message.

In some aspects, a transmit power for the preamble is dynamically configured based on at least one of: a transmission occasion in which the preamble is to be transmitted, a carrier to be used to transmit the preamble, a pathloss measurement for the carrier, a transmission bandwidth assigned for transmission of the preamble, a power spectral density target for transmission of the preamble, a pathloss compensation factor for transmission of the preamble, or a combination thereof. In some aspects, a transmit power for the payload is dynamically configured based on at least one of: a transmission occasion in which the payload is to be transmitted, a carrier to be used to transmit the payload, a pathloss measurement for the carrier, a transmission bandwidth assigned for transmission of the payload, a power spectral density target for transmission of the payload, a pathloss compensation factor for transmission of the payload, or a combination thereof. In some aspects, the QoS requirement is based at least in part on a reference signal received power (RSRP) parameter.

Another innovative aspect of the subject matter described in this disclosure can be implemented in a UE for wireless communication. The UE may include memory and one or more processors operatively coupled to the memory. The memory and the one or more processors may be configured to determine a QoS requirement associated with a payload of a random access message, where the random access message includes a preamble and the payload; and transmit the preamble and the payload based on a priority that is determined using the QoS requirement.

In some aspects, the priority is determined based on a determination that the UE is operating in a carrier aggregation mode, a dual connectivity mode, or a supplemental uplink mode. In some aspects, the priority relates to multiple cell groups, multiple frequency ranges, or multiple component carriers with which the UE is configured to operate. In some aspects, the priority indicates at least one of: a cell group on which at least one of the preamble or the payload is to be transmitted, a component carrier on which at least one of the preamble or the payload is to be transmitted, a transmission power with which at least one of the preamble or the payload is to be transmitted, or a combination thereof.

In some aspects, the preamble and the payload are transmitted using a same cell group based on a determination that the QoS requirement satisfies a threshold. In some aspects, the threshold is based on at least one of a collision probability of random selection of preamble or demodulation reference signal (DMRS) sequences, available transmission occasions on different uplink carriers, one or more channel quality measurements, one or more interference measurements, or a combination thereof. In some aspects, the preamble and the payload are transmitted using different cell groups based on a determination that the QoS requirement does not satisfy a threshold.

In some aspects, the priority is determined based on whether the random access message is to be transmitted as an initial transmission or a re-transmission. In some aspects, the priority is determined based on a determination that the UE is configured with a first cell group that uses a first frequency range and is configured with a second cell group that uses a second frequency range. In some aspects, the first frequency range is a sub-6 gigahertz frequency range and the second frequency range is at least one of a millimeter wave frequency range, a different carrier frequency within the sub-6 gigahertz frequency range that has a different pathloss than the first frequency range, or an unlicensed spectrum frequency range. In some aspects, the preamble and the payload are transmitted using the first cell group based on a determination that the QoS requirement satisfies a threshold. In some aspects, the preamble is transmitted using the first cell group and the payload is transmitted using the second cell group based on a determination that the QoS requirement does not satisfy a threshold. In some aspects, the preamble and the payload are transmitted using a different cell group for a first transmission occasion and are transmitted using a same cell group for a second transmission occasion.

In some aspects, the priority is determined based on a determination that the UE is configured with a first cell group having a higher density of transmission occasions or a higher peak power constraint and a second cell group having a lower density of transmission occasions or a lower peak power constraint. In some aspects, the first cell group and the second cell group use a same frequency range. In some aspects, the preamble and the payload are transmitted using the first cell group based on a determination that the QoS requirement satisfies a threshold. The preamble is transmitted using the first cell group and the payload is transmitted using the second cell group based on a determination that the QoS requirement does not satisfy a threshold.

In some aspects, the preamble and the payload are transmitted using a same transmit power based on a determination that the QoS requirement satisfies a threshold. In some aspects, the same transmit power is higher than a transmit power used for other uplink transmissions that overlap with the preamble or the payload of the random access message. In some aspects, the preamble and the payload are transmitted using different transmit powers based on a determination that the QoS requirement does not satisfy a threshold. In some aspects, the threshold is based on at least one of a collision probability of random selection of preamble or DMRS sequences, available transmission occasions on different uplink carriers, one or more channel quality measurements, one or more interference measurements, or a combination thereof. In some aspects, a first transmit power used for the preamble is higher than a second transmit power used for the payload and is higher than a transmit power used for other uplink transmissions that overlap with the preamble of the random access message.

In some aspects, the UE is configured to disable uplink transmissions that overlap with the preamble or the payload of the random access message. In some aspects, the uplink transmissions are disabled on one or more carriers that are not configured with transmission occasions for the random access message. In some aspects, uplink control information for the disabled uplink transmissions is multiplexed with the payload of the random access message.

In some aspects, a transmit power for the preamble is dynamically configured based on at least one of: a transmission occasion in which the preamble is to be transmitted, a carrier to be used to transmit the preamble, a pathloss measurement for the carrier, a transmission bandwidth assigned for transmission of the preamble, a power spectral density target for transmission of the preamble, a pathloss compensation factor for transmission of the preamble, or a combination thereof. In some aspects, a transmit power for the payload is dynamically configured based on at least one of: a transmission occasion in which the payload is to be transmitted, a carrier to be used to transmit the payload, a pathloss measurement for the carrier, a transmission bandwidth assigned for transmission of the payload, a power spectral density target for transmission of the payload, a pathloss compensation factor for transmission of the payload, or a combination thereof. In some aspects, the QoS requirement is based at least in part on a reference signal received power (RSRP) parameter.

Yet another innovative aspect of the subject matter described in this disclosure can be implemented in a non-transitory computer-readable medium storing one or more instructions for wireless communication. The one or more instructions, when executed by one or more processors of a UE, may cause the one or more processors to determine a QoS requirement associated with a payload of a random access message, where the random access message includes a preamble and the payload; and transmit the preamble and the payload based on a priority that is determined using the QoS requirement.

In some aspects, the priority is determined based on a determination that the UE is operating in a carrier aggregation mode, a dual connectivity mode, or a supplemental uplink mode. In some aspects, the priority relates to multiple cell groups, multiple frequency ranges, or multiple component carriers with which the UE is configured to operate. In some aspects, the priority indicates at least one of: a cell group on which at least one of the preamble or the payload is to be transmitted, a component carrier on which at least one of the preamble or the payload is to be transmitted, a transmission power with which at least one of the preamble or the payload is to be transmitted, or a combination thereof.

In some aspects, the preamble and the payload are transmitted using a same cell group based on a determination that the QoS requirement satisfies a threshold. In some aspects, the threshold is based on at least one of a collision probability of random selection of preamble or demodulation reference signal (DMRS) sequences, available transmission occasions on different uplink carriers, one or more channel quality measurements, one or more interference measurements, or a combination thereof. In some aspects, the preamble and the payload are transmitted using different cell groups based on a determination that the QoS requirement does not satisfy a threshold.

In some aspects, the priority is determined based on whether the random access message is to be transmitted as an initial transmission or a re-transmission. In some aspects, the priority is determined based on a determination that the UE is configured with a first cell group that uses a first frequency range and is configured with a second cell group that uses a second frequency range. In some aspects, the first frequency range is a sub-6 gigahertz frequency range and the second frequency range is at least one of a millimeter wave frequency range, a different carrier frequency within the sub-6 gigahertz frequency range that has a different pathloss than the first frequency range, or an unlicensed spectrum frequency range. In some aspects, the preamble and the payload are transmitted using the first cell group based on a determination that the QoS requirement satisfies a threshold. In some aspects, the preamble is transmitted using the first cell group and the payload is transmitted using the second cell group based on a determination that the QoS requirement does not satisfy a threshold. In some aspects, the preamble and the payload are transmitted using a different cell group for a first transmission occasion and are transmitted using a same cell group for a second transmission occasion.

In some aspects, the priority is determined based on a determination that the UE is configured with a first cell group having a higher density of transmission occasions or a higher peak power constraint and a second cell group having a lower density of transmission occasions or a lower peak power constraint. In some aspects, the first cell group and the second cell group use a same frequency range. In some aspects, the preamble and the payload are transmitted using the first cell group based on a determination that the QoS requirement satisfies a threshold. is the preamble is transmitted using the first cell group and the payload is transmitted using the second cell group based on a determination that the QoS requirement does not satisfy a threshold.

In some aspects, the preamble and the payload are transmitted using a same transmit power based on a determination that the QoS requirement satisfies a threshold. In some aspects, the same transmit power is higher than a transmit power used for other uplink transmissions that overlap with the preamble or the payload of the random access message. In some aspects, the preamble and the payload are transmitted using different transmit powers based on a determination that the QoS requirement does not satisfy a threshold. In some aspects, the threshold is based on at least one of a collision probability of random selection of preamble or DMRS sequences, available transmission occasions on different uplink carriers, one or more channel quality measurements, one or more interference measurements, or a combination thereof. In some aspects, a first transmit power used for the preamble is higher than a second transmit power used for the payload and is higher than a transmit power used for other uplink transmissions that overlap with the preamble of the random access message.

In some aspects, the UE is configured to disable uplink transmissions that overlap with the preamble or the payload of the random access message. In some aspects, the uplink transmissions are disabled on one or more carriers that are not configured with transmission occasions for the random access message. In some aspects, uplink control information for the disabled uplink transmissions is multiplexed with the payload of the random access message.

In some aspects, a transmit power for the preamble is dynamically configured based on at least one of: a transmission occasion in which the preamble is to be transmitted, a carrier to be used to transmit the preamble, a pathloss measurement for the carrier, a transmission bandwidth assigned for transmission of the preamble, a power spectral density target for transmission of the preamble, a pathloss compensation factor for transmission of the preamble, or a combination thereof. In some aspects, a transmit power for the payload is dynamically configured based on at least one of: a transmission occasion in which the payload is to be transmitted, a carrier to be used to transmit the payload, a pathloss measurement for the carrier, a transmission bandwidth assigned for transmission of the payload, a power spectral density target for transmission of the payload, a pathloss compensation factor for transmission of the payload, or a combination thereof. In some aspects, the QoS requirement is based at least in part on a reference signal received power (RSRP) parameter.

Still another innovative aspect of the subject matter described in this disclosure can be implemented in an apparatus for wireless communication. The apparatus may include means for determining a QoS requirement associated with a payload of a random access message, where the random access message includes a preamble and the payload; and means for transmitting the preamble and the payload based on a priority that is determined using the QoS requirement.

In some aspects, the priority is determined based on a determination that the apparatus is operating in a carrier aggregation mode, a dual connectivity mode, or a supplemental uplink mode. In some aspects, the priority relates to multiple cell groups, multiple frequency ranges, or multiple component carriers with which the apparatus is configured to operate. In some aspects, the priority indicates at least one of: a cell group on which at least one of the preamble or the payload is to be transmitted, a component carrier on which at least one of the preamble or the payload is to be transmitted, a transmission power with which at least one of the preamble or the payload is to be transmitted, or a combination thereof.

In some aspects, the preamble and the payload are transmitted using a same cell group based on a determination that the QoS requirement satisfies a threshold. In some aspects, the threshold is based on at least one of a collision probability of random selection of preamble or demodulation reference signal (DMRS) sequences, available transmission occasions on different uplink carriers, one or more channel quality measurements, one or more interference measurements, or a combination thereof. In some aspects, the preamble and the payload are transmitted using different cell groups based on a determination that the QoS requirement does not satisfy a threshold.

In some aspects, the priority is determined based on whether the random access message is to be transmitted as an initial transmission or a re-transmission. In some aspects, the priority is determined based on a determination that the apparatus is configured with a first cell group that uses a first frequency range and is configured with a second cell group that uses a second frequency range. In some aspects, the first frequency range is a sub-6 gigahertz frequency range and the second frequency range is at least one of a millimeter wave frequency range, a different carrier frequency within the sub-6 gigahertz frequency range that has a different pathloss than the first frequency range, or an unlicensed spectrum frequency range. In some aspects, the preamble and the payload are transmitted using the first cell group based on a determination that the QoS requirement satisfies a threshold. In some aspects, the preamble is transmitted using the first cell group and the payload is transmitted using the second cell group based on a determination that the QoS requirement does not satisfy a threshold. In some aspects, the preamble and the payload are transmitted using a different cell group for a first transmission occasion and are transmitted using a same cell group for a second transmission occasion.

In some aspects, the priority is determined based on a determination that the apparatus is configured with a first cell group having a higher density of transmission occasions or a higher peak power constraint and a second cell group having a lower density of transmission occasions or a lower peak power constraint. In some aspects, the first cell group and the second cell group use a same frequency range. In some aspects, the preamble and the payload are transmitted using the first cell group based on a determination that the QoS requirement satisfies a threshold. is the preamble is transmitted using the first cell group and the payload is transmitted using the second cell group based on a determination that the QoS requirement does not satisfy a threshold.

In some aspects, the preamble and the payload are transmitted using a same transmit power based on a determination that the QoS requirement satisfies a threshold. In some aspects, the same transmit power is higher than a transmit power used for other uplink transmissions that overlap with the preamble or the payload of the random access message. In some aspects, the preamble and the payload are transmitted using different transmit powers based on a determination that the QoS requirement does not satisfy a threshold. In some aspects, the threshold is based on at least one of a collision probability of random selection of preamble or DMRS sequences, available transmission occasions on different uplink carriers, one or more channel quality measurements, one or more interference measurements, or a combination thereof. In some aspects, a first transmit power used for the preamble is higher than a second transmit power used for the payload and is higher than a transmit power used for other uplink transmissions that overlap with the preamble of the random access message.

In some aspects, the apparatus is configured to disable uplink transmissions that overlap with the preamble or the payload of the random access message. In some aspects, the uplink transmissions are disabled on one or more carriers that are not configured with transmission occasions for the random access message. In some aspects, uplink control information for the disabled uplink transmissions is multiplexed with the payload of the random access message.

In some aspects, a transmit power for the preamble is dynamically configured based on at least one of: a transmission occasion in which the preamble is to be transmitted, a carrier to be used to transmit the preamble, a pathloss measurement for the carrier, a transmission bandwidth assigned for transmission of the preamble, a power spectral density target for transmission of the preamble, a pathloss compensation factor for transmission of the preamble, or a combination thereof. In some aspects, a transmit power for the payload is dynamically configured based on at least one of: a transmission occasion in which the payload is to be transmitted, a carrier to be used to transmit the payload, a pathloss measurement for the carrier, a transmission bandwidth assigned for transmission of the payload, a power spectral density target for transmission of the payload, a pathloss compensation factor for transmission of the payload, or a combination thereof. In some aspects, the QoS requirement is based at least in part on a reference signal received power (RSRP) parameter.

Aspects generally include a method, apparatus, system, computer program product, non-transitory computer-readable medium, user equipment, base station, wireless communication device, and processing system as substantially described herein with reference to and as illustrated by the accompanying drawings and specification.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
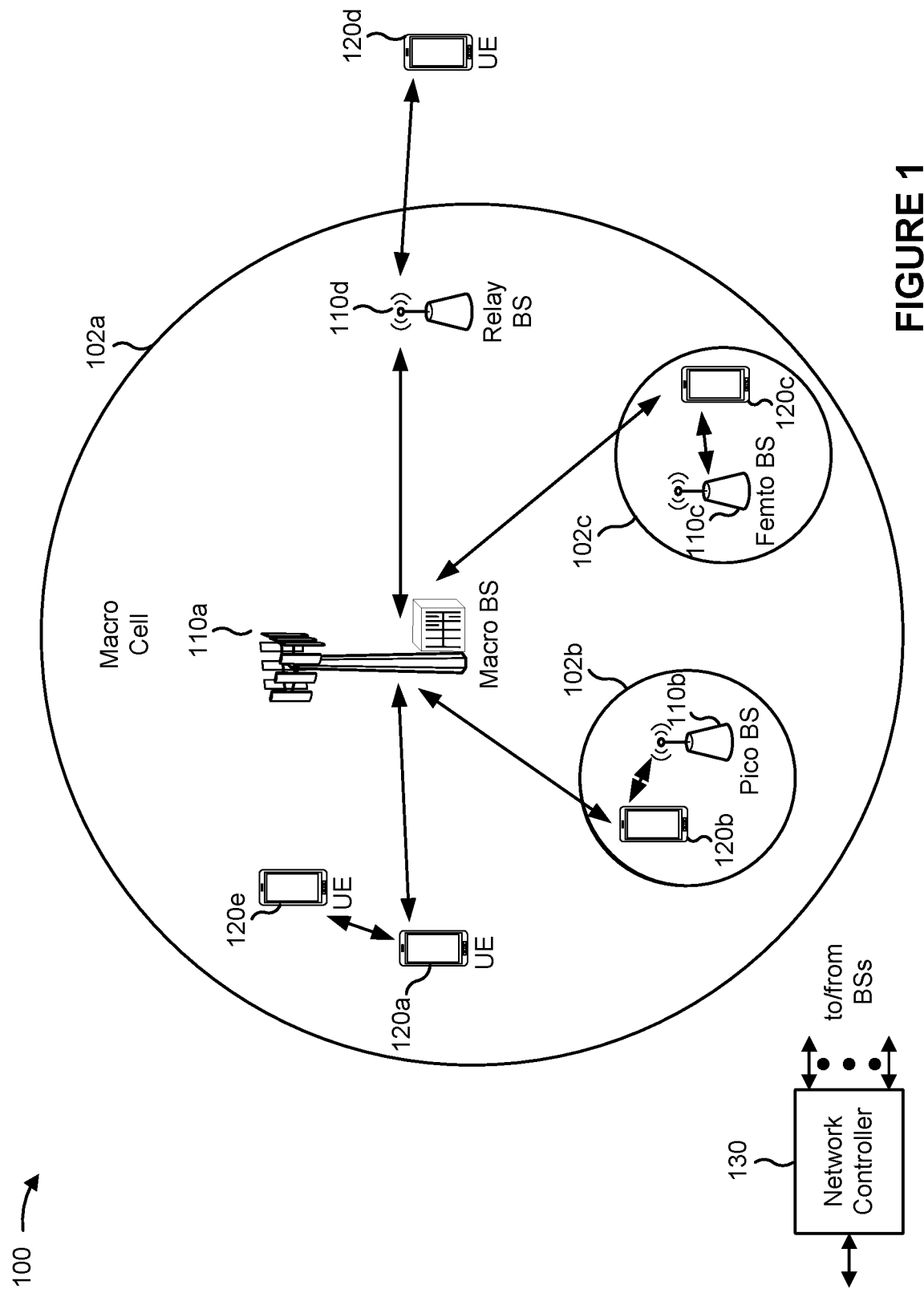
FIG. 1 is a block diagram illustrating an example of a wireless network.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving radio frequency signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

Some techniques and apparatuses described herein assist a user equipment (UE) with balancing quality of service (QoS) requirements (such as access latency or reliability requirements) and consumption of high priority network resources (such as for load balancing) when transmitting a random access message (RAM) in a two-step random access channel (RACH) procedure. As a result, the UE may be capable of satisfying QoS requirements for the RAM while reducing an impact of transmission of the RAM on other uplink transmissions. Furthermore, some techniques and apparatuses described herein assist a UE with prioritizing portions of the RAM in different UE operating modes, such as a dual connectivity mode, a carrier aggregation mode, or a supplemental uplink mode. Some techniques and apparatuses described herein employ cross-carrier scheduling, dynamic power sharing, or dynamic power control to achieve these and other performance improvements.

Particular implementations of the subject matter described in this disclosure can be implemented to realize one or more of the following potential advantages. For example, this disclosure may assist a user equipment (UE) with balancing quality of service (QoS) requirements (such as access latency or reliability requirements) and consumption of high priority network resources (such as for load balancing) when transmitting a random access message (RAM) in a two-step random access channel (RACH) procedure. As a result, the UE may be capable of satisfying QoS requirements for the RAM while reducing an impact of transmission of the RAM on other uplink transmissions. Furthermore, some techniques and apparatuses described herein assist a UE with prioritizing portions of the RAM in different UE operating modes, such as a dual connectivity mode, a carrier aggregation mode, or a supplemental uplink mode. Some techniques and apparatuses described herein employ cross-carrier scheduling, dynamic power sharing, or dynamic power control to achieve these and other performance improvements. Furthermore, some techniques and apparatuses described herein may enable load balancing of RAMs having different priorities. Furthermore, some techniques and apparatuses described herein may enable co-existence between UEs having different capabilities, such as a premium UE and a reduced capability UE, among other examples. Furthermore, some techniques and apparatuses described herein may enable coverage enhancement for UEs located at a cell edge, such as by controlling a transmit power for RAM transmission.

FIG. 1 is a block diagram illustrating an example of a wireless network 100. The wireless network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and also may be referred to as a base station, a NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS, a BS subsystem serving this coverage area, or a combination thereof, depending on the context in which the term is used.

A BS may provide communication coverage for a macro cell, a pico cell, a femto cell, another type of cell, or a combination thereof. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (for example, three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another as well as to one or more other BSs or network nodes (not shown) in the wireless network 100 through various types of backhaul interfaces, such as a direct physical connection, a virtual network, or a combination thereof using any suitable transport network.

Wireless network 100 also may include relay stations. A relay station is an entity that can receive a transmission of data from an upstream station (for example, a BS or a UE) and send a transmission of the data to a downstream station (for example, a UE or a BS). A relay station also may be a UE that can relay transmissions for other UEs. In the example shown in FIG. 1, a relay station 110d may communicate with macro BS 110a and a UE 120d in order to facilitate communication between BS 110a and UE 120d. A relay station also may be referred to as a relay BS, a relay base station, a relay, etc.

Wireless network 100 may be a heterogeneous network that includes BSs of different types, for example, macro BSs, pico BSs, femto BSs, relay BSs, etc. These different types of BSs may have different transmit power levels, different coverage areas, and different impacts on interference in wireless network 100. For example, macro BSs may have a high transmit power level (for example, 5 to 40 Watts) whereas pico BSs, femto BSs, and relay BSs may have lower transmit power levels (for example, 0.1 to 2 Watts).

A network controller 130 may couple to a set of BSs and may provide coordination and control for these BSs. Network controller 130 may communicate with the BSs via a backhaul. The BSs also may communicate with one another, for example, directly or indirectly via a wireless or wireline backhaul.

UEs 120 (for example, 120a, 120b, 120c) may be dispersed throughout wireless network 100, and each UE may be stationary or mobile. A UE also may be referred to as an access terminal, a terminal, a mobile station, a subscriber unit, a station, etc. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices or may be implemented as NB-IoT (narrowband internet of things) devices. Some UEs may be considered a Customer Premises Equipment (CPE). UE 120 may be included inside a housing that houses components of UE 120, such as processor components, memory components, similar components, or a combination thereof.

In general, any number of wireless networks may be deployed in a given geographic area. Each wireless network may support a particular RAT and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, where a scheduling entity (for example, a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (for example, one or more other UEs). In this example, the UE is functioning as a scheduling entity, and other UEs utilize resources scheduled by the UE for wireless communication. A UE may function as a scheduling entity in a peer-to-peer (P2P) network, in a mesh network, or another type of network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

In some aspects, two or more UEs 120 (for example, shown as UE 120a and UE 120e) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the UE 120 may perform scheduling operations, resource selection operations, as well as other operations described elsewhere herein as being performed by the base station 110.

Figure 2:
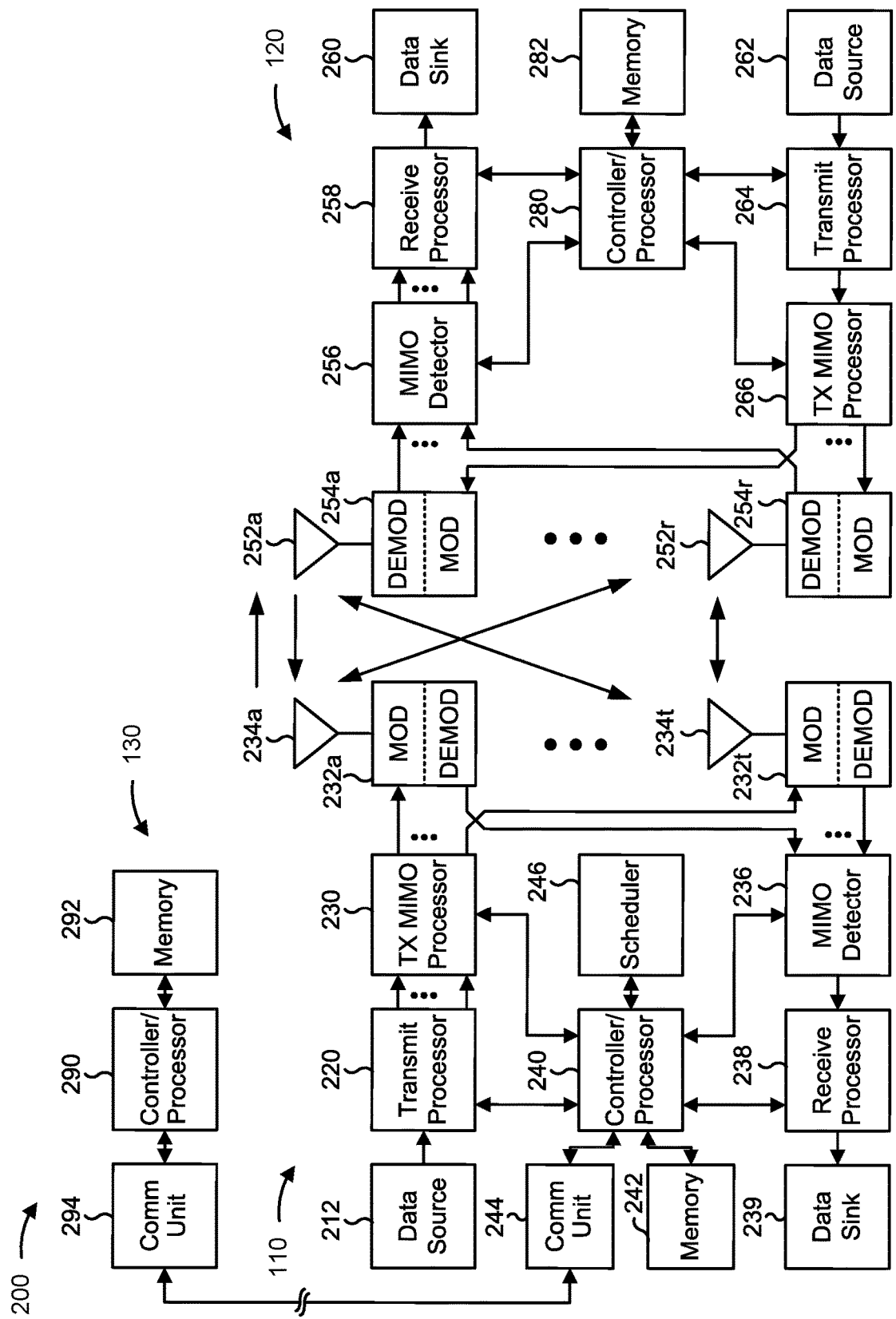
FIG. 2 is a block diagram illustrating an example of a base station in communication with a user equipment (UE) in a wireless network.

FIG. 2 is a block diagram illustrating an example 200 of a base station 110 in communication with a UE 120. In some aspects, base station 110 and UE 120 may respectively be one of the base stations and one of the UEs in wireless network 100 of FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based on channel quality indicators (CQIs) received from the UE, process (for example, encode and modulate) the data for each UE based on the MCS(s) selected for the UE, and provide data symbols for all UEs. The transmit processor 220 also may process system information (for example, for semi-static resource partitioning information (SRPI), etc.) and control information (for example, CQI requests, grants, upper layer signaling, etc.) and provide overhead symbols and control symbols. The transmit processor 220 also may generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each modulator 232 may process a respective output symbol stream (for example, for OFDM, etc.) to obtain an output sample stream. Each modulator 232 may further process (for example, convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 or other base stations and may provide received signals to demodulators (DEMODs) 254a through 254r, respectively. Each demodulator 254 may condition (for example, filter, amplify, downconvert, and digitize) a received signal to obtain input samples. Each demodulator 254 may further process the input samples (for example, for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (for example, demodulate and decode) the detected symbols, provide decoded data for UE 120 to a data sink 260, and provide decoded control information and system information to a controller or processor (controller/processor) 280. A channel processor may determine reference signal received power (RSRP), received signal strength indicator (RSSI), reference signal received quality (RSRQ), channel quality indicator (CQI), etc. In some aspects, one or more components of UE 120 may be included in a housing.

On the uplink, at UE 120, a transmit processor 264 may receive and process data from a data source 262 and control information (for example, for reports including RSRP, RSSI, RSRQ, CQI, etc.) from controller/processor 280. Transmit processor 264 also may generate reference symbols for one or more reference signals. The symbols from transmit processor 264 may be precoded by a TX MIMO processor 266 if applicable, further processed by modulators 254a through 254r (for example, for DFT-s-OFDM, CP-OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to a controller or processor (i.e., controller/processor) 240. The base station 110 may include communication unit 244 and communicate to network controller 130 via communication unit 244. The network controller 130 may include communication unit 294, a controller or processor (i.e., controller/processor) 290, and memory 292.

Controller/processor 240 of base station 110, controller/processor 280 of UE 120, or any other component(s) of FIG. 2 may perform one or more techniques associated with priority handling for a random access message that includes a preamble and a payload, as described in more detail elsewhere herein. For example, controller/processor 240 of base station 110, controller/processor 280 of UE 120, or any other component(s) (or combinations of components) of FIG. 2 may perform or direct operations of, for example, process 800 of FIG. 8, process 900 of FIG. 9, or other processes as described herein. Memories 242 and 282 may store data and program codes for base station 110 and UE 120, respectively. A scheduler 246 may schedule UEs for data transmission on the downlink, the uplink, or a combination thereof.

Figure 8:
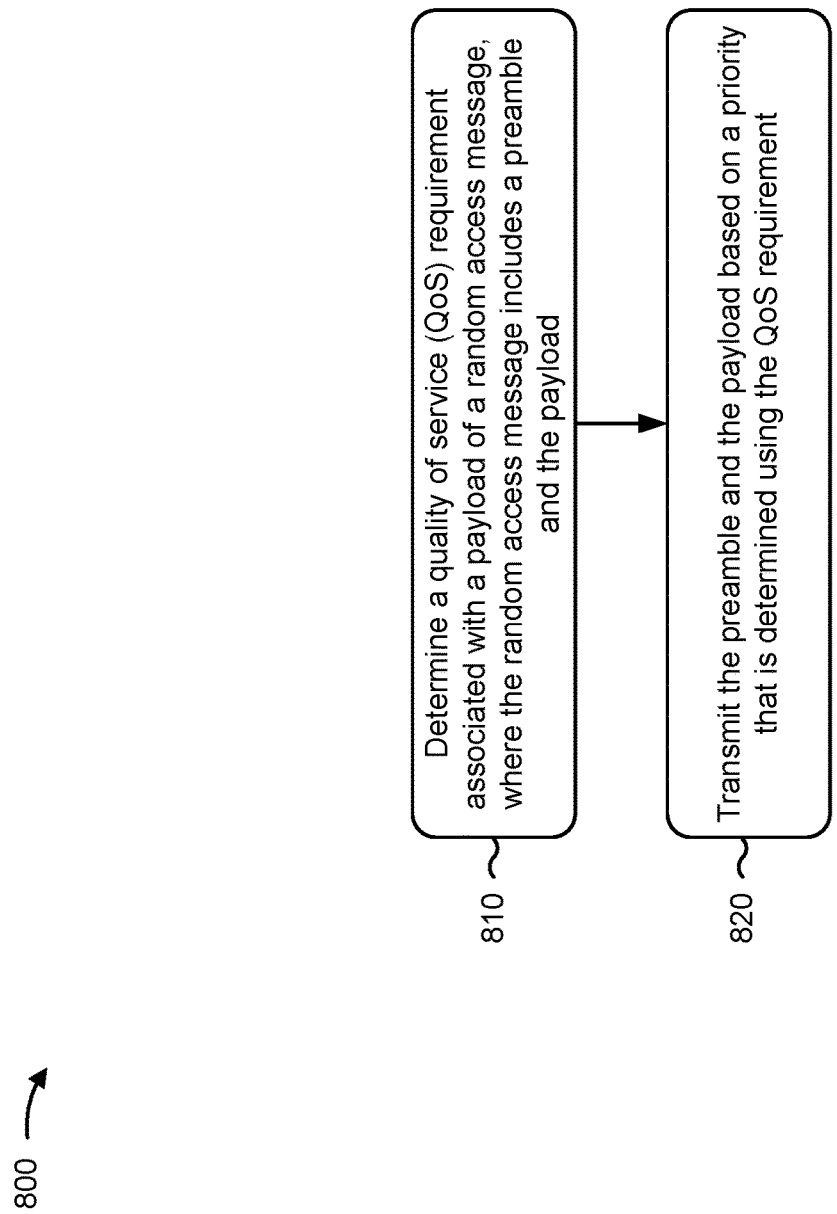
FIG. 8 is a diagram illustrating an example process performed, for example, by a UE.
Figure 9:
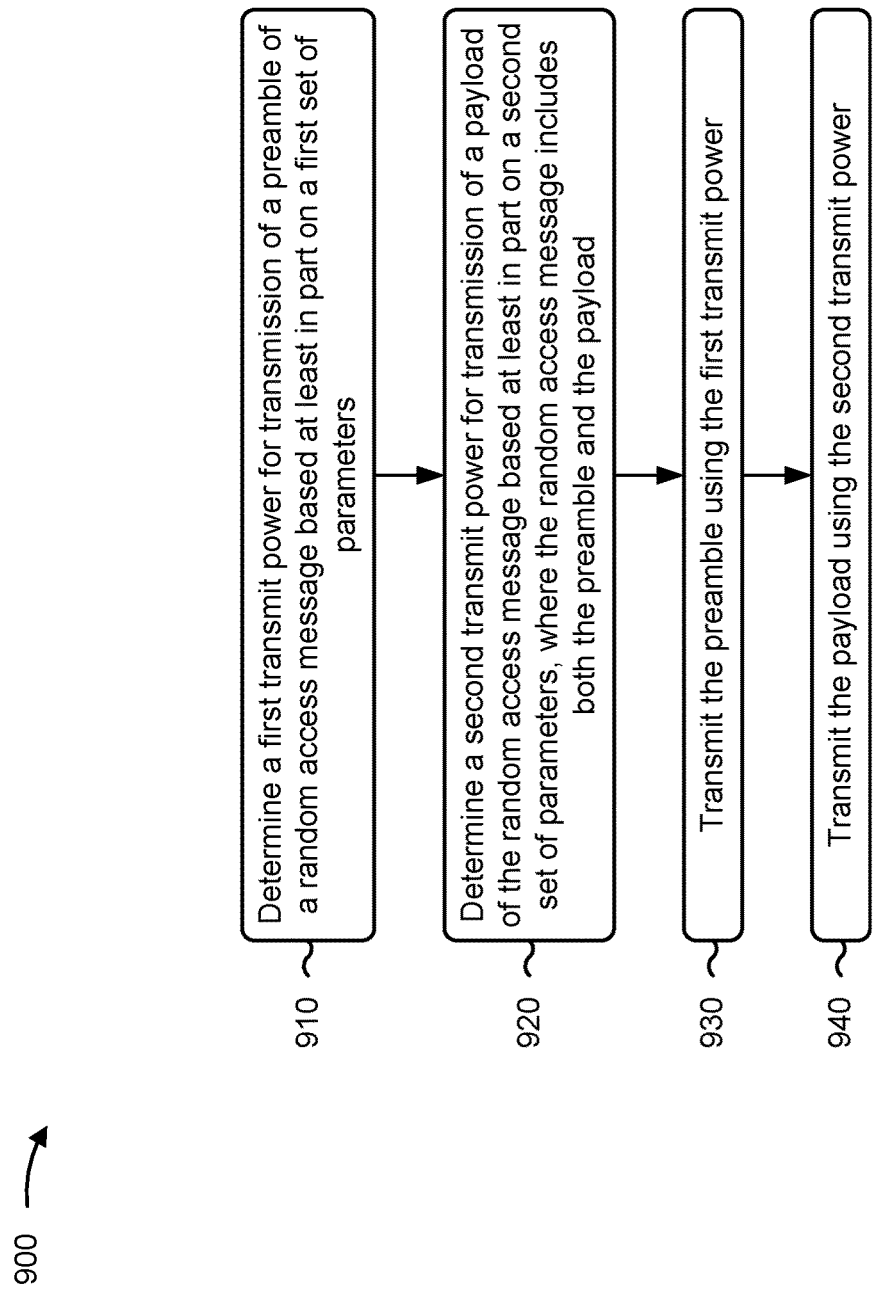
FIG. 9 is a diagram illustrating another example process performed, for example, by a UE.

The stored program codes, when executed by controller/processor 280 or other processors and modules at UE 120, may cause the UE 120 to perform operations described with respect to process 800 of FIG. 8, process 900 of FIG. 9, or other processes as described herein. A scheduler 246 may schedule UEs for data transmission on the downlink, the uplink, or a combination thereof.

In some aspects, UE 120 may include means for determining a QoS requirement associated with a payload of a random access message that includes a preamble and the payload, means for transmitting the preamble and the payload based on a priority that is determined using the QoS requirement, or the like, or combinations thereof. In some aspects, such means may include one or more components of UE 120 described in connection with FIG. 2.

In some aspects, UE 120 may include means for determining a first transmit power for transmission of a preamble of a random access message based at least in part on a first set of parameters; means for determining a second transmit power for transmission of a payload of the random access message based at least in part on a second set of parameters, where the random access message includes both the preamble and the payload; means for transmitting the preamble using the first transmit power; means for transmitting the payload using the second transmit power; or the like. In some aspects, such means may include one or more components of UE 120 described in connection with FIG. 2.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, the TX MIMO processor 266, or another processor may be performed by or under the control of controller/processor 280.

Figure 3:
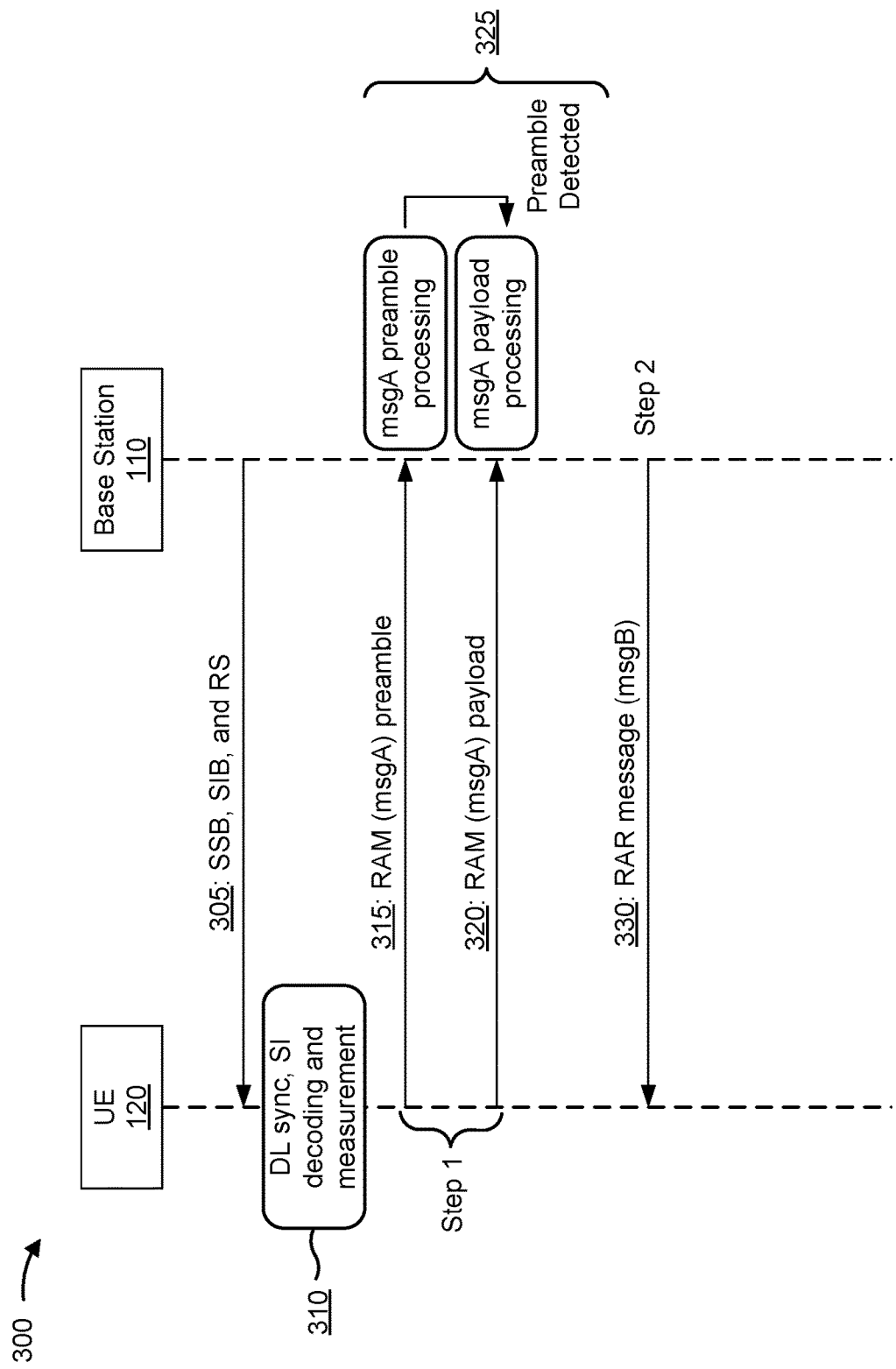
FIG. 3 is a diagram illustrating an example of a two-step random access channel (RACH) procedure.

FIG. 3 is a diagram illustrating an example 300 of a two-step random access channel procedure. As shown in FIG. 3, a base station 110 and a UE 120 may communicate with one another to perform the two-step random access channel (RACH) procedure.

In a first operation 305, the base station 110 may transmit, and the UE 120 may receive, one or more synchronization signal blocks (SSBs), system information blocks (SIBs), or reference signals (RSs). In a second operation 310, the UE 120 may perform downlink (DL) synchronization (such as by using one or more SSBs), may decode system information (SI) that is included in one or more SIBs, or may perform one or more measurements of the RS(s). Based on performing the second operation 310, the UE 120 may determine parameters for transmitting a random access message (RAM) in the two-step RACH procedure. For example, the UE 120 may determine one or more physical random access channel (PRACH) transmission parameters to be used to transmit the RAM, may determine one or more parameters for generating a preamble of the RAM, may identify one or more uplink resources on which the RAM is to be transmitted, or the like.

In a third operation 315, the UE 120 may transmit a RAM preamble. In a fourth operation 320, the UE 120 may transmit a RAM payload. As shown, the UE 120 may transmit the RAM preamble and the RAM payload as part of a first step of the two-step RACH procedure. The RAM is sometimes referred to as message A, msgA, or a first message in a two-step RACH procedure. The RAM preamble is sometimes referred to as a message A preamble, a msgA preamble, or a preamble. The RAM payload is sometimes referred to as a message A payload, a msgA payload, or a payload. The RAM may include some or all of the contents of message 1 (msg1) and message 3 (msg3) of a four-step RACH procedure. For example, the RAM preamble may include some or all contents of message 1 (such as a RACH preamble). The RAM payload may include some or all contents of message 3 (such as a UE identifier, uplink control information, or the like).

In a fourth operation 325, the base station 110 may receive the RAM preamble transmitted by the UE 120. If the base station 110 successfully receives and decodes the RAM preamble, the base station 110 may then receive and decode the RAM payload. In a fifth operation 330, the base station 110 may transmit a random access response (RAR) message. As shown, the base station 110 may transmit the RAR message as part of a second step of the two-step RACH procedure. The RAR message is sometimes referred to as message B, msgB, or a second message in a two-step RACH procedure. The RAR message may include some or all of the contents of message 2 (msg2) and message 4 (msg4) of a four-step RACH procedure. For example, the RAR message may include the detected RACH preamble identifier, the detected UE identifier, a timing advance value, contention resolution information, or the like.

Figure 4:
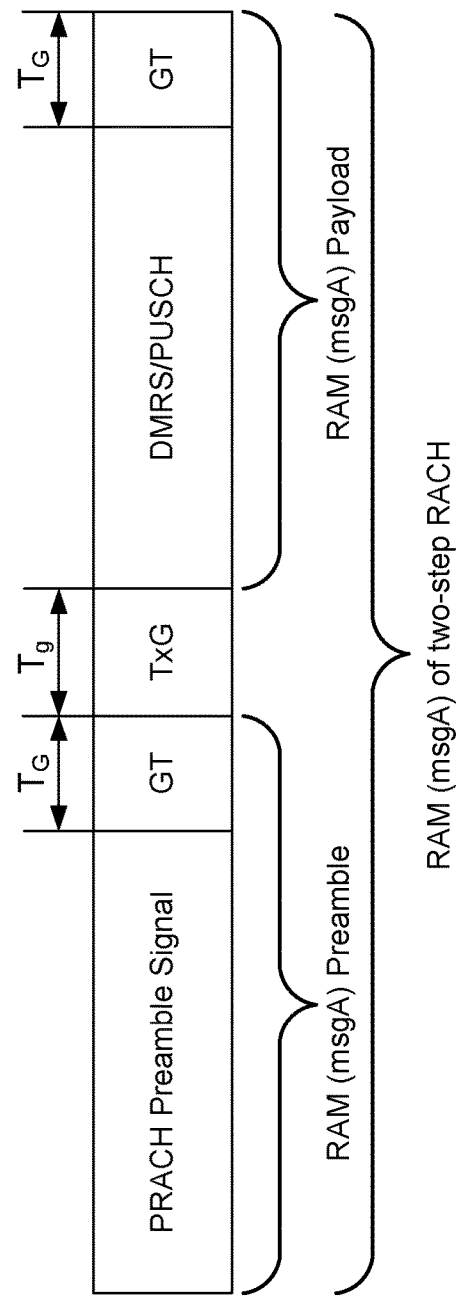
FIG. 4 is a diagram illustrating an example of a random access message that includes a random access message preamble and a random access message payload.

FIG. 4 is a diagram illustrating an example 400 of a random access message that includes a random access message preamble and a random access message payload. As shown, the RAM of the two-step RACH procedure may include a RAM preamble and a RAM payload, as described above. The RAM preamble may include a PRACH preamble signal and a guard time (shown as GT, with a duration of $T_G$). The RAM payload may include a demodulation reference signal (DMRS) or a physical uplink shared channel (PUSCH) communication, as well as a guard time (also shown as GT, with a duration of $T_G$). As further shown, transmission of the RAM preamble and transmission of the RAM payload may be separated in time by a transmission guard time (shown as TxG, with a duration of $T_g$).

In a four-step RACH procedure, a UE 120 always transmits message 1 (corresponding to the RAM preamble) with a higher priority than message 3 (corresponding to the RAM payload). However, in an NR RAT, a two-step RACH procedure may be used in a variety of scenarios with different quality of service (QoS) requirements for the RAM payload or different connection states of the UE 120 (such as a radio resource control (RRC) connected state, an RRC active state, or an RRC idle state). Due to the variety of scenarios in which the two-step RACH procedure may be used, the UE 120 may obtain performance benefits by treating different portions of the combined RAM (such as a RAM preamble portion and a RAM payload portion) with the same priority in some scenarios and different priorities in other scenarios.

For example, when the UE 120 is in an RRC active state or an RRC idle state, the RAM payload may include an RRC connection request, an RRC resumption request, or an RRC re-establishment request. These types of requests may have a small payload and may be associated with a high QoS requirement, such as a low latency requirement, a high reliability requirement, or the like. The UE 120 may assist with satisfying the high QoS requirement of the RAM payload by treating the RAM payload with the same high priority as the RAM preamble (whereas the RAM preamble or message 1 would normally always be treated with a higher priority than the RAM payload or message 3). Thus, the UE 120 may improve reliability or reduce latency for high priority RAM payloads. Furthermore, since the RAM payload tends to be small in these scenarios, the impact on the network as a result of prioritizing this type of RAM payload is minimal (such as consumption of higher priority network resources that could be used for other transmissions).

As another example, when the UE 120 is in an RRC connected state, the RAM payload may include user plane or control plane information. This information may have a large payload and may be associated with a lower QoS requirement, such as a relaxed (high) latency requirement, a relaxed (low) reliability requirement, or the like. The UE 120 may assist with satisfying the lower QoS requirement while permitting higher priority network resources to be available for other transmissions by treating the RAM payload with a lower priority than the RAM preamble.

In some cases, the UE 120 may operate using multiple cell groups or multiple frequency ranges (such as in a dual connectivity mode) or may operate using multiple component carriers (such as in a carrier aggregation mode or a supplemental uplink mode). The different cell groups, frequency ranges, or component carriers may have different characteristics or configurations that lead to different reliabilities or different latencies for transmissions. The UE 120 may take these characteristics or configurations into account when determining how to transmit the RAM preamble and the RAM payload in different scenarios (such as when the RAM preamble and the RAM payload are treated with the same priority or different priorities).

Figure 5:
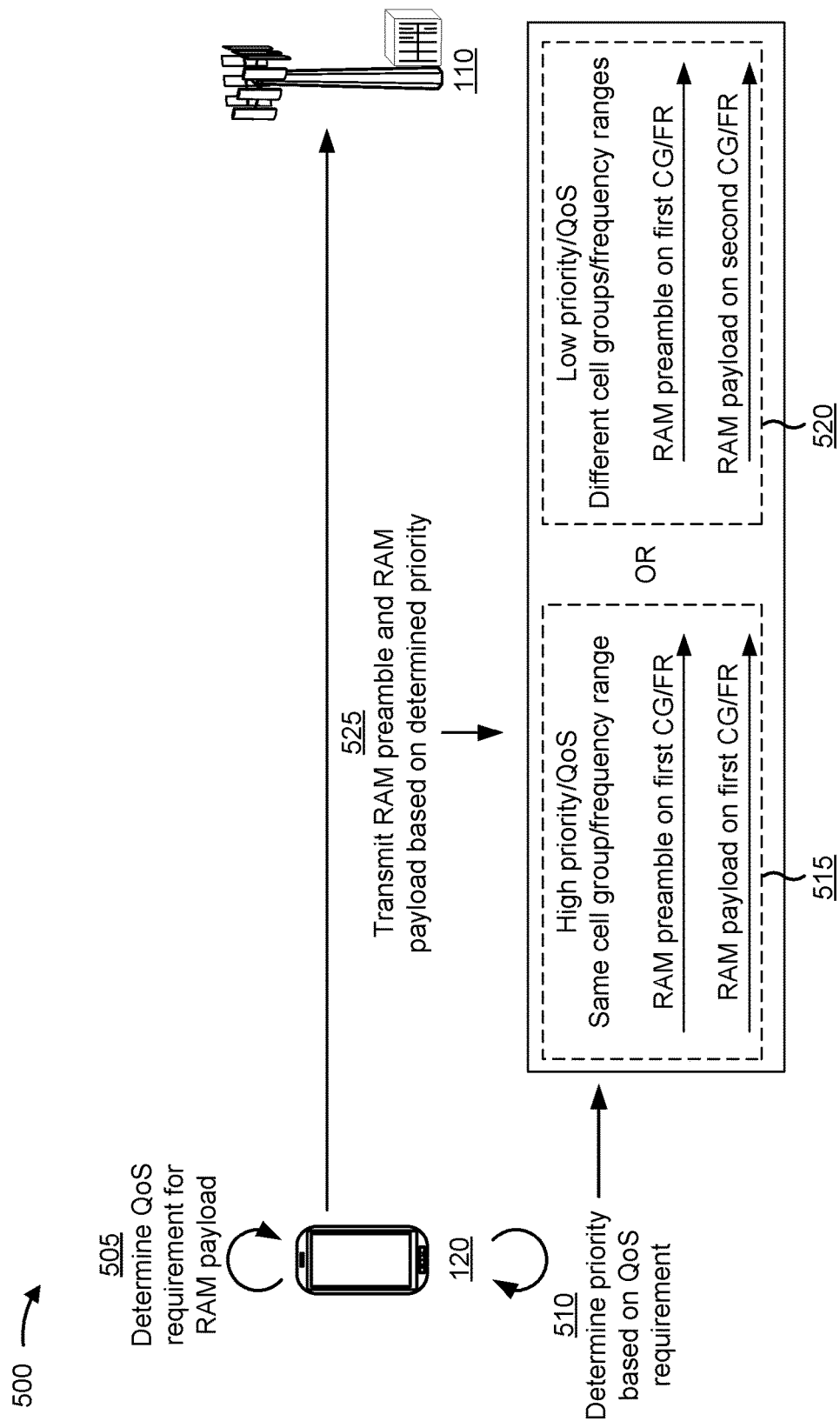
FIGS. 5-7 are diagrams illustrating examples of priority handling for a random access message that includes a preamble and a payload.

FIG. 5 is a diagram illustrating an example 500 of priority handling for a random access message that includes a preamble and a payload. As shown in FIG. 5, a base station 110 and a UE 120 may communicate with one another to perform the two-step RACH procedure. As part of the two-step RACH procedure, the UE 120 may transmit a RAM, including a RAM preamble and a RAM payload, to the base station 110.

In a first operation 505, the UE 120 may determine a QoS requirement for a RAM payload of the RAM. As described above, in some cases the RAM payload may have a relatively high QoS requirement (that satisfies a threshold), such as a low latency requirement (that is less than or equal to a threshold), a high reliability requirement (that is greater than or equal to a threshold), or the like. For example, the RAM payload may have a relatively high QoS requirement when the UE 120 transmits the RAM in an RRC active state or an RRC idle state. Additionally, or alternatively, the RAM payload may have a relatively high QoS requirement when the RAM payload includes an RRC connection request, an RRC resumption request, or an RRC re-establishment request.

As also described above, in some cases the RAM payload may have a relatively low QoS requirement (that does not satisfy a threshold), such as a high latency requirement (that is greater than or equal to a threshold), a low reliability requirement (that is less than or equal to a threshold), or the like. For example, the RAM payload may have a relatively low QoS requirement when the UE 120 transmits the RAM in an RRC connected state. Additionally, or alternatively, the RAM payload may have a relatively low QoS requirement when the RAM payload includes user plane information or control plane information. In some aspects, the UE 120 may determine a QoS requirement for the RAM payload based on an RRC state of the UE. Additionally, or alternatively, the UE 120 may determine a QoS requirement for the RAM payload based on contents to be transmitted in the RAM payload.

In some aspects, the RAM payload may have a relatively low QoS requirement when the RAM transmission is an initial transmission. Conversely, the RAM payload may have a relatively high QoS requirement when the RAM transmission is a re-transmission (such as after a failed transmission of the RAM where a RAR message is not successfully received by the UE 120). In some aspects, a determination of the QoS requirement depending on whether the RAM transmission is an initial transmission or a re-transmission may be independent of contents of the RAM or an RRC state of the UE 120 at a time when the RAM is transmitted.

In a second operation 510, the UE 120 may determine a priority for the RAM based on the QoS requirement of the RAM payload. For example, the UE 120 may determine a priority for the RAM payload. The priority may indicate whether the RAM payload is to be treated with the same priority or with a different priority (such as a lower priority) than the RAM preamble included in the RAM. In some aspects, the UE 120 may determine the priority based on a determination that the UE 120 is operating in a dual connectivity mode (such as a dual connectivity mode that uses cell groups on two RATs or a dual connectivity mode that uses multiple cell groups on a single RAT), a carrier aggregation mode, or a supplemental uplink mode. In the dual connectivity mode, the UE 120 may communicate using multiple cell groups or multiple frequency ranges. In this mode, the priority may relate to whether to transmit the RAM preamble and the RAM payload using the same cell group or the same frequency range, or whether to transmit the RAM preamble and the RAM payload using different cell groups or different frequency ranges. Thus, the priority may indicate a cell group or a frequency range to be used to transmit the RAM preamble or the RAM payload.

When the UE 120 is operating in a dual connectivity mode, the UE 120 may operate using a first cell group and a second cell group. The first cell group may be associated with better performance than the second cell group. For example, the first cell group may be a master cell group (MCG) and the second cell group may be a secondary cell group (SCG). Additionally, or alternatively, the first cell group may use a first frequency range that is more reliable than a second frequency range used for the second cell group. In some aspects, the first frequency range may be an FR1 frequency range, such as a sub-6 gigahertz (GHz) frequency range. The second frequency range may be an FR2 frequency range (such as a millimeter wave frequency range), may be an unlicensed spectrum frequency range, or may be a different carrier frequency within the sub-6 gigahertz frequency range that has a different pathloss characteristic (such as a higher pathloss) than the first frequency range.

In a third operation 515, the UE 120 may determine to treat the RAM payload with a high priority when the RAM payload has a high QoS requirement (such as a more stringent QoS requirement or a QoS requirement that satisfies a threshold or a condition). In this case, the UE 120 may treat the RAM payload and the RAM preamble with a same priority. For example, the UE 120 may determine to transmit the RAM preamble and the RAM payload using the same cell group and, consequently, using the same frequency range. For example, the UE 120 may transmit the RAM preamble and the RAM payload using an MCG or using FR1, thereby prioritizing transmission of the RAM preamble and the RAM payload as compared to transmitting using the SCG or using FR2.

As an alternative to the third operation 515, in a fourth operation 520, the UE 120 may determine to treat the RAM payload with a low priority when the RAM payload has a low QoS requirement (such as a less stringent QoS requirement or a QoS requirement that does not satisfy a threshold or a condition). In this case, the UE 120 may treat the RAM payload and the RAM preamble with different priorities. For example, the UE 120 may treat the RAM payload with a lower priority than the RAM preamble. For example, the UE 120 may determine to transmit the RAM preamble and the RAM payload using different cell group, which may result in transmission of the RAM preamble and the RAM payload using different frequency ranges (such as when the different cell groups are configured with different frequency range). For example, the UE 120 may transmit the RAM preamble using an MCG or using FR1, and may transmit the RAM payload using an SCG or using FR2, thereby prioritizing transmission of the RAM preamble over transmission of the RAM payload.

In some aspects, when the UE 120 determines to treat the RAM payload with a low priority based on a QoS requirement, the UE 120 may determine to treat the RAM payload with the low priority for an initial transmission of the RAM payload, but may treat the RAM payload with a high priority for a re-transmission. In this case, the UE 120 may transmit the RAM preamble and the RAM payload using different priorities (for example, using different cell groups or different frequency ranges) for a first transmission occasion associated with the initial transmission. The UE 120 may later transmit the RAM preamble and the RAM payload using the same priority (for example, using the same cell group or the same frequency range) for a second transmission occasion associated with the re-transmission.

In some aspects, the UE 120 may configure the threshold (sometimes referred to as a QoS threshold) or the condition (sometimes referred to as a QoS condition) to which the QoS requirement is to be compared. For example, the UE 120 may determine a QoS level capable of being supported by a cell group, a frequency range, a component carrier, or the like. If the QoS level of a cell group, frequency range, or component carrier is capable of satisfying a QoS requirement for the RAM payload, then the UE 120 may use that cell group, frequency range, or component carrier to transmit the RAM payload. However, if the QoS level is not capable of satisfying the QoS requirement for the RAM payload, then the UE 120 may transmit the RAM payload using a higher priority cell group, frequency range, or component carrier (associated with a higher QoS level, for example).

The UE 120 may determine the QoS level based on, for example, a collision probability determined for the RAM payload. The collision probability may be based on, for example, an available pool of RAM preamble sequences or DMRS sequences from which the UE 120 may randomly select a RAM preamble sequence or a DMRS sequence. Additionally, or alternatively, the UE 120 may determine the QoS level for a component carrier (CC) based on available transmission occasions on that CC, which may be based on a number of transmission occasions on that CC (such as in a time period), a density of transmission occasions on that CC, a periodicity of transmission occasions on that CC, or the like. Additionally, or alternatively, the UE 120 may determine the QoS level based on one or more channel quality measurements, such as a reference signal received power (RSRP) measurement, a reference signal received quality (RSRQ) measurement, or the like. Additionally, or alternatively, the UE 120 may determine the QoS level based on one or more interference measurements, such as for inter-cell interference or intra-cell interference. In some aspects, the UE 120 may determine the QoS level based on one or more downlink measurements (such as an SSB measurement or an RS measurement) or based on system information (which may be obtained as described above in connection with operation 305 of FIG. 3).

In a fifth operation 525, the UE 120 may transmit the RAM preamble and the RAM payload based on the determined priority (which is determined based on one or more QoS requirements of the RAM payload). For example, as described above, the UE 120 may transmit the RAM preamble and the RAM payload using the same cell group or the same frequency range when the RAM payload is associated with a high priority (which may be due to a high QoS requirement or a re-transmission of the RAM payload). Alternatively, as described above, the UE 120 may transmit the RAM preamble and the RAM payload using different cell groups or different frequency ranges when the RAM payload is associated with a low priority (which may be due to a low QoS requirement or an initial transmission of the RAM payload).

By balancing QoS requirements and consumption of high priority network resources when transmitting a RAM in a two-step RACH procedure, the UE 120 may be capable of reducing latency or increasing reliability of the RAM transmission while reducing an impact of transmission of the RAM on other uplink transmissions when appropriate.

Figure 6:
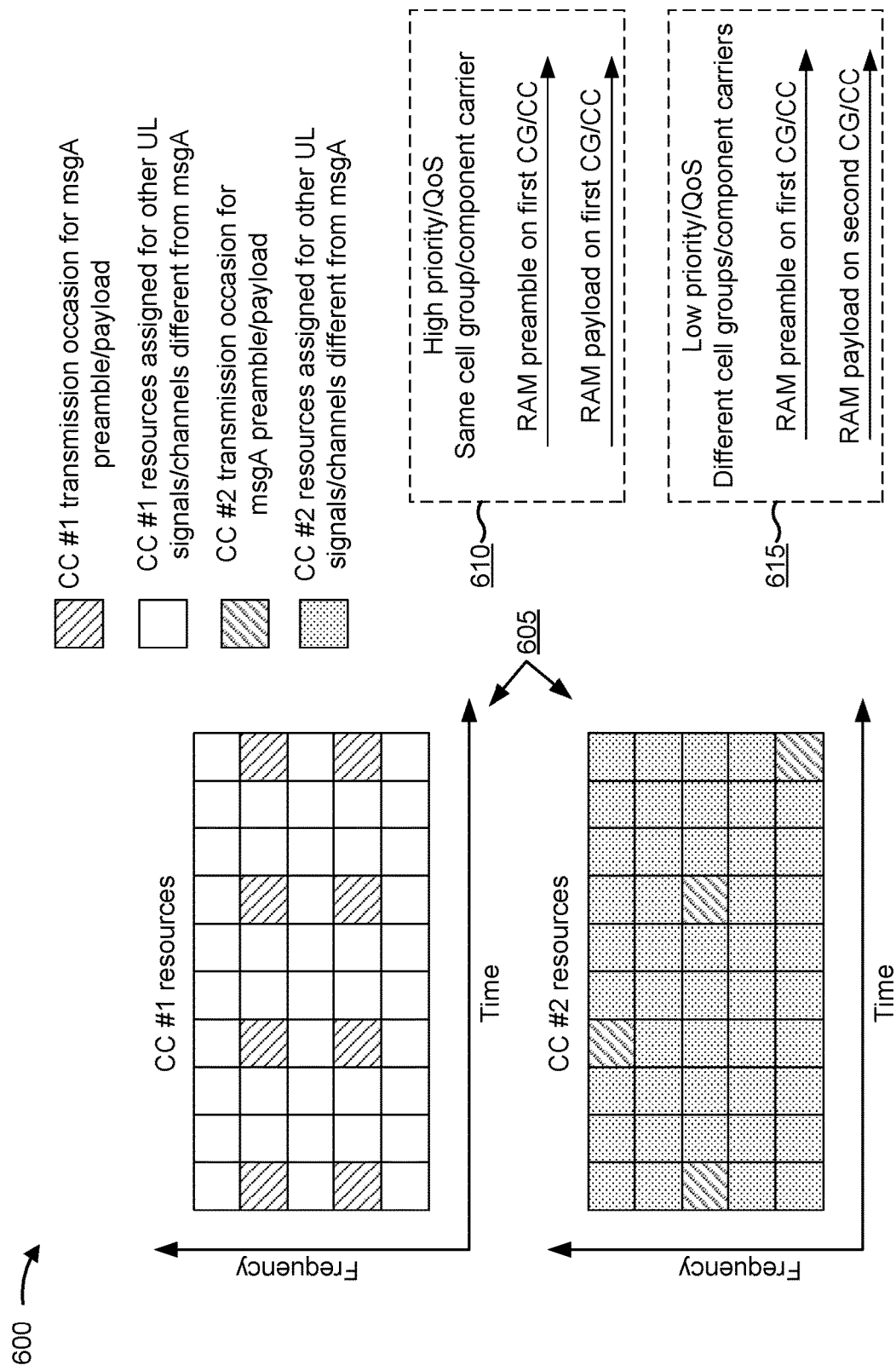

FIG. 6 is a diagram illustrating an example 600 of priority handling for a random access message that includes a preamble and a payload. FIG. 6 shows priority handling of the RAM within the two-step RACH procedure in a different scenario than that described above in connection with FIG. 5. In some aspects, the UE 120 may apply the techniques described in connection with FIG. 6 independent of or in combination with the techniques described above in connection with FIG. 5. As indicated above in connection with operation 510 of FIG. 5, the UE 120 may determine a priority for the RAM based on the QoS requirement of the RAM payload.

In some aspects, the UE 120 may determine the priority based on a determination that the UE 120 is operating in a carrier aggregation mode (with multiple paired uplink and downlink CCs) or a supplemental uplink mode (with a single downlink CC and two or more uplink CCs). In these modes, the UE 120 may communicate using multiple cell groups or multiple CCs, and the priority may relate to whether to transmit the RAM preamble and the RAM payload using the same cell group or the same CC, or whether to transmit the RAM preamble and the RAM payload using different cell groups or different CCs. Thus, the priority may indicate a cell group or a CC to be used to transmit the RAM preamble or the RAM payload.

When the UE 120 is operating in a carrier aggregation mode or a supplemental uplink mode, the UE 120 may operate using a first CC (such as a first uplink CC, which may be included in a first set of uplink CCs in a first cell group) and a second CC (such as a second uplink CC, which may be included in a second set of uplink CCs in a second cell group). The first CC may be associated with better performance than the second CC for RAM transmissions. For example, the first CC may have a higher density of transmission occasions for the RAM (sometimes referred to as RAM transmission occasions) as compared to the second CC, as shown at 605 in FIG. 6. A density of RAM transmission occasions may refer to a number of RAM transmission occasions in a particular time period, which may be affected by a number of resource blocks (RBs) available for RAM transmission occasions (with a larger number of RBs resulting in a higher density), a time periodicity of RAM transmission occasions (with a shorter periodicity resulting in a higher density), a frequency distribution of RAM transmission occasions, or the like. In some aspects, the first CC and the second CC may use a same frequency range (for example, both CCs may use FR1 or both CCs may use FR2).

In a first operation 610, the UE 120 may determine to treat the RAM payload with a high priority when the RAM payload has a high QoS requirement, as described above in connection with FIG. 5. In this case, the UE 120 may treat the RAM payload and the RAM preamble with a same priority. For example, the UE 120 may determine to transmit the RAM preamble and the RAM payload using the same CC and, consequently, using the same cell group. For example, the UE 120 may transmit the RAM preamble and the RAM payload using a first CC with a higher density of transmission occasions as compared to a second CC, thereby prioritizing transmission of the RAM preamble and the RAM payload as compared to transmitting using the second CC.

As an alternative to the first operation 610, in a second operation 615, the UE 120 may determine to treat the RAM payload with a low priority when the RAM payload has a low QoS requirement, as described above in connection with FIG. 5. In this case, the UE 120 may treat the RAM payload and the RAM preamble with different priorities. For example, the UE 120 may treat the RAM payload with a lower priority than the RAM preamble. For example, the UE 120 may determine to transmit the RAM preamble and the RAM payload using different CCs, which may result in transmission of the RAM preamble and the RAM payload using different cell groups (such as when the different CCs are included in different cell groups). For example, the UE 120 may transmit the RAM preamble using a first CC with a higher density of transmission occasions as compared to a second CC, and may transmit the RAM payload using the second CC, thereby prioritizing transmission of the RAM preamble over transmission of the RAM payload.

By balancing QoS requirements and consumption of high priority network resources when transmitting a RAM in a two-step RACH procedure, the UE 120 may be capable of reducing latency or increasing reliability of the RAM transmission while reducing an impact of transmission of the RAM on other uplink transmissions when appropriate.

Figure 7:
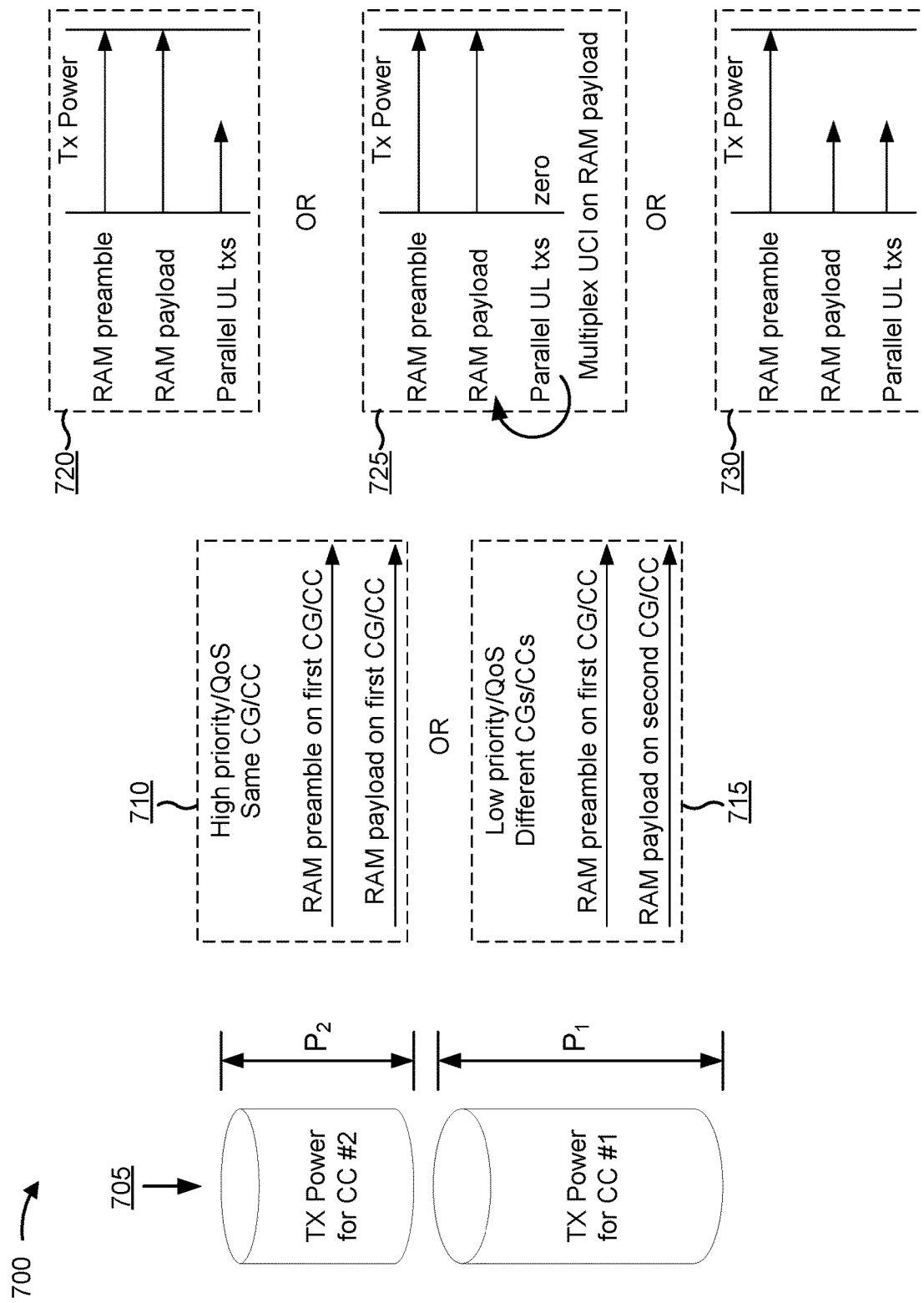

FIG. 7 is a diagram illustrating an example 700 of priority handling for a random access message that includes a preamble and a payload. FIG. 7 shows priority handling of the RAM within the two-step RACH procedure in a different scenario than that described above in connection with FIG. 5 and FIG. 6. In some aspects, the UE 120 may apply the techniques described in connection with FIG. 7 independent of or in combination with the techniques described above in connection with FIG. 5 or FIG. 6. As indicated above in connection with operation 510 of FIG. 5, the UE 120 may determine a priority for the RAM based on the QoS requirement of the RAM payload.

In some aspects, the UE 120 may determine the priority based on a determination that the UE 120 is operating in a carrier aggregation mode (with multiple paired uplink and downlink CCs) or a supplemental uplink mode (with a single downlink CC and two or more uplink CCs), as described above in connection with FIG. 6. When the UE 120 is operating in a carrier aggregation mode or a supplemental uplink mode, the UE 120 may operate using a first CC and a second CC. The first CC may be associated with better performance than the second CC for RAM transmissions. For example, as shown at 705, the first CC may have a higher peak power constraint, shown as $P_1$, as compared to the second CC (which may have a lower peak power constraint, shown as $P_2$), which permits a transmission or multiple concurrent transmissions on the first CC to use a higher transmit power than the second CC. In some aspects, the first CC and the second CC may use a same frequency range.

In a first operation 710, the UE 120 may determine to treat the RAM payload with a high priority when the RAM payload has a high QoS requirement, as described above in connection with FIG. 5. In this case, the UE 120 may treat the RAM payload and the RAM preamble with a same priority. For example, the UE 120 may determine to transmit the RAM preamble and the RAM payload using the same CC and, consequently, using the same cell group. For example, the UE 120 may transmit the RAM preamble and the RAM payload using a first CC with a higher peak power constraint as compared to a second CC, thereby prioritizing transmission of the RAM preamble and the RAM payload as compared to transmitting using the second CC.

As an alternative to the first operation 710, in a second operation 715, the UE 120 may determine to treat the RAM payload with a low priority when the RAM payload has a low QoS requirement, as described above in connection with FIG. 5. In this case, the UE 120 may treat the RAM payload and the RAM preamble with different priorities. For example, the UE 120 may treat the RAM payload with a lower priority than the RAM preamble. For example, the UE 120 may determine to transmit the RAM preamble and the RAM payload using different CCs, which may result in transmission of the RAM preamble and the RAM payload using different cell groups (such as when the different CCs are included in different cell groups). For example, the UE 120 may transmit the RAM preamble using a first CC with a higher peak power constraint as compared to a second CC, and may transmit the RAM payload using the second CC with a lower peak power constraint, thereby prioritizing transmission of the RAM preamble over transmission of the RAM payload.

In a third operation 720, the UE 120 may transmit the RAM preamble and the RAM payload using the same transmit power when the UE 120 determines to transmit the RAM preamble and the RAM payload with the same priority. As further shown, the transmit power used to transmit the RAM preamble and the RAM payload may be higher than a transmit power used for other uplink transmissions that occur in parallel with the RAM transmission (for example, other uplink transmissions that overlap with or are concurrent with the RAM preamble or the RAM payload, such as a sounding reference signal (SRS), a physical uplink control channel (PUCCH) communication, a physical uplink shared channel (PUSCH) transmission, or the like). In this way, the UE 120 may prioritize transmission of the RAM preamble and the RAM payload over other uplink transmissions that overlap with the RAM.

In some aspects, as shown by a fourth operation 725, the UE 120 may disable uplink transmissions that occur in parallel with the RAM transmission. As shown, the UE 120 may disable those parallel uplink transmissions when the RAM preamble and the RAM payload are transmitted with the same priority (for example, the same transmit power). Alternatively, the UE 120 may disable those parallel uplink transmissions when the RAM preamble and the RAM payload are transmitted with different priorities (for example, different transmit powers). In some aspects, the UE 120 may disable parallel uplink transmissions on one or more carriers via which the RAM is not transmitted or on one or more carriers that are not configured with transmission occasions for the RAM. As further shown, in some aspects, the UE 120 may multiplex uplink control information (UCI) for the disabled uplink transmissions with the RAM payload. In this way, the RAM may be prioritized over the parallel uplink transmissions while still transmitting the UCI that would otherwise be dropped by disabling the parallel uplink transmissions.

In a fifth operation 730, the UE 120 may transmit the RAM preamble and the RAM payload using different transmit powers when the UE 120 determines to transmit the RAM preamble and the RAM payload with different priorities. In this case, the UE 120 may transmit the RAM preamble with a higher transmit power, and may transmit the RAM payload with a lower transmit power. As further shown, the transmit power used to transmit the RAM preamble may be higher than a transmit power used for the RAM payload and may be higher than a transmit power used for other uplink transmissions that occur in parallel with the RAM preamble. In some aspects, the transmit power for the RAM payload and the transmit power for the parallel uplink transmissions may be the same. In this way, the UE 120 may prioritize transmission of the RAM preamble over the RAM payload and other uplink transmissions that overlap with the RAM preamble.

In some aspects, the UE 120 may apply dynamic power sharing or other power control schemes to enable the techniques described above. For example, the UE 120 may adjust a transmit power used for one or more carriers to accommodate transmission of the RAM preamble or the RAM payload as described above, subject to a total power constraint across CCs (such as $P_{MAX}$) or a peak power constraint per CC (such as $P_{1,MAX}$, $P_{2,MAX}$, and so on). For example, the UE 120 may adjust a ratio of transmit power across different CCs.

In some aspects, the UE 120 may dynamically configure a transmit power for a RAM preamble or a RAM payload using a power control formula. The power control formula for the RAM preamble may be based on one or more of a transmission occasion in which the RAM preamble is to be transmitted, a carrier (a CC) to be used to transmit the RAM preamble, a pathloss measurement for the carrier, a transmission bandwidth assigned for transmission of the RAM preamble, a power spectral density target for transmission of the RAM preamble, a pathloss compensation factor for transmission of the RAM preamble, or the like. Similarly, the power control formula for the RAM payload may be based on one or more of a transmission occasion in which the RAM payload is to be transmitted, a carrier (a CC) to be used to transmit the RAM payload, a pathloss measurement for the carrier, a transmission bandwidth assigned for transmission of the RAM payload, a power spectral density target for transmission of the RAM payload, a pathloss compensation factor for transmission of the RAM payload, or the like.

In some aspects, the power control formula for determining a transmit power $P_{msgA}$ for a RAM transmission (msgA) may be as follows:

$$P_{msgA}(i,j,l) = \min\{P_{max}(j), 10\log(M(i,j)) + P_0(i,j) + \alpha(i,j) PL(j,l) + \Delta_{TF}(i,j,l)\}$$

In the above power control formula, i may represent an index of transmission occasion for the RAM preamble or the RAM payload, j may represent an index of the uplink carrier (the uplink CC), l may represent an index of a two-step RACH UE, Pmax(j) may represent a maximum transmit power (a peak power constraint) on carrier j, M(i, j) may represent a transmission bandwidth assigned for RAM transmission on occasion i and carrier j, $P_0$(i, j) may represent a power spectral density target of power control for RAM transmission on occasion i and carrier j, $\alpha$(i, j) may represent a pathloss compensation factor for RAM transmission on occasion i and carrier j, PL(j, l) may represent a pathloss measurement of UE l on carrier j, and $\Delta_{TF}$(i, j, l) may represent a power offset related to a transport format.

By balancing QoS requirements and consumption of high priority network resources when transmitting a RAM in a two-step RACH procedure, the UE 120 may be capable of reducing latency or increasing reliability of the RAM transmission while reducing an impact of transmission of the RAM on other uplink transmissions when appropriate.

FIG. 8 is a diagram illustrating an example process 800 performed, for example, by a UE. Example process 800 is an example where a UE (such as UE 120 or the like) performs operations associated with priority handling for a random access message that includes a preamble and a payload.

As shown in FIG. 8, in some aspects, process 800 may include determining a QoS requirement associated with a payload of a random access message, where the random access message includes a preamble and the payload (block 810). For example, the UE (such as using receive processor 258, transmit processor 264, controller/processor 280, memory 282, or the like) may determine a QoS requirement associated with a payload of a random access message, as described above. In some aspects, the random access message includes a preamble and the payload.

As further shown in FIG. 8, in some aspects, process 800 may include transmitting the preamble and the payload based on a priority that is determined using the QoS requirement (block 820). For example, the UE (such as using receive processor 258, transmit processor 264, controller/processor 280, memory 282, or the like) may transmit the preamble and the payload based on a priority that is determined using the QoS requirement, as described above.

Process 800 may include additional aspects, such as any single implementation or any combination of aspects described below or in connection with one or more other processes described elsewhere herein.

In a first aspect, the priority is determined based on a determination that the UE is operating in a carrier aggregation mode, a dual connectivity mode, or a supplemental uplink mode.

In a second aspect, alone or in combination with the first aspect, the priority relates to multiple cell groups, multiple frequency ranges, or multiple component carriers with which the UE is configured to operate.

In a third aspect, alone or in combination with one or more of the first through second aspects, the priority indicates at least one of: a cell group on which at least one of the preamble or the payload is to be transmitted, a component carrier on which at least one of the preamble or the payload is to be transmitted, a transmission power with which at least one of the preamble or the payload is to be transmitted, or a combination thereof.

In a fourth aspect, alone or in combination with one or more of the first through third aspects, the preamble and the payload are transmitted using a same cell group based on a determination that the QoS requirement satisfies a threshold.

In a fifth aspect, alone or in combination with one or more of the first through fourth aspects, the threshold is based on at least one of a collision probability of random selection of preamble or DMRS sequences, available transmission occasions on different uplink carriers, one or more channel quality measurements, one or more interference measurements, or a combination thereof.

In a sixth aspect, alone or in combination with one or more of the first through fifth aspects, the preamble and the payload are transmitted using different cell groups based on a determination that the QoS requirement does not satisfy a threshold.

In a seventh aspect, alone or in combination with one or more of the first through sixth aspects, the priority is determined based on whether the random access message is to be transmitted as an initial transmission or a re-transmission.

In an eighth aspect, alone or in combination with one or more of the first through seventh aspects, the priority is determined based on a determination that the UE is configured with a first cell group that uses a first frequency range and is configured with a second cell group that uses a second frequency range.

In a ninth aspect, alone or in combination with one or more of the first through eighth aspects, the first frequency range is a sub-6 gigahertz frequency range and the second frequency range is at least one of a millimeter wave frequency range, a different carrier frequency within the sub-6 gigahertz frequency range that has a different pathloss than the first frequency range, or an unlicensed spectrum frequency range.

In a tenth aspect, alone or in combination with one or more of the first through ninth aspects, the preamble and the payload are transmitted using the first cell group based on a determination that the QoS requirement satisfies a threshold.

In an eleventh aspect, alone or in combination with one or more of the first through tenth aspects, the threshold is based on at least one of a collision probability of random selection of preamble or DMRS sequences, available transmission occasions on different uplink carriers, one or more channel quality measurements, one or more interference measurements, or a combination thereof.

In a twelfth aspect, alone or in combination with one or more of the first through eleventh aspects, the preamble is transmitted using the first cell group and the payload is transmitted using the second cell group based on a determination that the QoS requirement does not satisfy a threshold.

In a thirteenth aspect, alone or in combination with one or more of the first through twelfth aspects, the preamble and the payload are transmitted using a different cell group for a first transmission occasion and are transmitted using a same cell group for a second transmission occasion.

In a fourteenth aspect, alone or in combination with one or more of the first through thirteenth aspects, the priority is determined based on a determination that the UE is configured with a first cell group having a higher density of transmission occasions or a higher peak power constraint and a second cell group having a lower density of transmission occasions or a lower peak power constraint.

In a fifteenth aspect, alone or in combination with one or more of the first through fourteenth aspects, the first cell group and the second cell group use a same frequency range.

In a sixteenth aspect, alone or in combination with one or more of the first through fifteenth aspects, the preamble and the payload are transmitted using the first cell group based on a determination that the QoS requirement satisfies a threshold.

In a seventeenth aspect, alone or in combination with one or more of the first through sixteenth aspects, the preamble is transmitted using the first cell group and the payload is transmitted using the second cell group based on a determination that the QoS requirement does not satisfy a threshold.

In an eighteenth aspect, alone or in combination with one or more of the first through seventeenth aspects, the preamble and the payload are transmitted using a same transmit power based on a determination that the QoS requirement satisfies a threshold.

In a nineteenth aspect, alone or in combination with one or more of the first through eighteenth aspects, the same transmit power is higher than a transmit power used for other uplink transmissions that overlap with the preamble or the payload of the random access message.

In a twentieth aspect, alone or in combination with one or more of the first through nineteenth aspects, the preamble and the payload are transmitted using different transmit powers based on a determination that the QoS requirement does not satisfy a threshold.

In a twenty-first aspect, alone or in combination with one or more of the first through twentieth aspects, the threshold is based on at least one of a collision probability of random selection of preamble or DMRS sequences, available transmission occasions on different uplink carriers, one or more channel quality measurements, one or more interference measurements, or a combination thereof.

In a twenty-second aspect, alone or in combination with one or more of the first through twenty-first aspects, a first transmit power used for the preamble is higher than a second transmit power used for the payload and is higher than a transmit power used for other uplink transmissions that overlap with the preamble of the random access message.

In a twenty-third aspect, alone or in combination with one or more of the first through twenty-second aspects, the UE is configured to disable uplink transmissions that overlap with the preamble or the payload of the random access message.

In a twenty-fourth aspect, alone or in combination with one or more of the first through twenty-third aspects, the uplink transmissions are disabled on one or more carriers that are not configured with transmission occasions for the random access message.

In a twenty-fifth aspect, alone or in combination with one or more of the first through twenty-fourth aspects, uplink control information for the disabled uplink transmissions is multiplexed with the payload of the random access message.

In a twenty-sixth aspect, alone or in combination with one or more of the first through twenty-fifth aspects, a transmit power for the preamble is dynamically configured based on at least one of: a transmission occasion in which the preamble is to be transmitted, a carrier to be used to transmit the preamble, a pathloss measurement for the carrier, a transmission bandwidth assigned for transmission of the preamble, a power spectral density target for transmission of the preamble, a pathloss compensation factor for transmission of the preamble, or a combination thereof.

In a twenty-seventh aspect, alone or in combination with one or more of the first through twenty-sixth aspects, a transmit power for the payload is dynamically configured based on at least one of: a transmission occasion in which the payload is to be transmitted, a carrier to be used to transmit the payload, a pathloss measurement for the carrier, a transmission bandwidth assigned for transmission of the payload, a power spectral density target for transmission of the payload, a pathloss compensation factor for transmission of the payload, or a combination thereof.

In a twenty-eighth aspect, alone or in combination with one or more of the first through twenty-seventh aspects, the QoS requirement is based at least in part on an RSRP parameter.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

FIG. 9 is a diagram illustrating an example process 900 performed, for example, by a UE. Example process 900 is an example where a UE (such as UE 120 or the like) performs operations associated with priority handling for a random access message that includes a preamble and a payload.

As shown in FIG. 9, in some aspects, process 900 may include determining a first transmit power for transmission of a preamble of a random access message based at least in part on a first set of parameters (block 910). For example, the UE (for example, using receive processor 258, transmit processor 264, controller/processor 280, memory 282, or the like) may determine a first transmit power for transmission of a preamble of a random access message based at least in part on a first set of parameters, as described above.

As shown in FIG. 9, in some aspects, process 900 may include determining a second transmit power for transmission of a payload of the random access message based at least in part on a second set of parameters, where the random access message includes both the preamble and the payload (block 920). For example, the UE (for example, using receive processor 258, transmit processor 264, controller/processor 280, memory 282, or the like) may determine a second transmit power for transmission of a payload of the random access message based at least in part on a second set of parameters, as described above. In some aspects, the random access message includes both the preamble and the payload.

As shown in FIG. 9, in some aspects, process 900 may include transmitting the preamble using the first transmit power (block 930). For example, the UE (for example, using transmit processor 264, controller/processor 280, memory 282, or the like) may transmit the preamble using the first transmit power, as described above.

As shown in FIG. 9, in some aspects, process 900 may include transmitting the payload using the second transmit power (block 940). For example, the UE (for example, using transmit processor 264, controller/processor 280, memory 282, or the like) may transmit the payload using the second transmit power, as described above.

Process 900 may include additional aspects, such as any single aspect or any combination of aspects described below or in connection with one or more other processes described elsewhere herein.

In a first aspect, the first set of parameters is different from the second set of parameters.

In a second aspect, alone or in combination with the first aspect, the first set of parameters includes at least one of: a transmission occasion in which the preamble is to be transmitted, a carrier to be used to transmit the preamble, a pathloss measurement for the carrier to be used to transmit the preamble, a transmission bandwidth assigned for transmission of the preamble, a power spectral density target for transmission of the preamble, a pathloss compensation factor for transmission of the preamble, or a combination thereof.

In a third aspect, alone or in combination with one or more of the first and second aspects, the second set of parameters includes at least one of: a transmission occasion in which the payload is to be transmitted, a carrier to be used to transmit the payload, a pathloss measurement for the carrier to be used to transmit the payload, a transmission bandwidth assigned for transmission of the payload, a power spectral density target for transmission of the payload, a pathloss compensation factor for transmission of the payload, or a combination thereof.

In a fourth aspect, alone or in combination with one or more of the first through third aspects, at least one of the first transmit power or the second transmit power is higher than a transmit power used for other uplink transmissions that overlap with the preamble or the payload of the random access message.

In a fifth aspect, alone or in combination with one or more of the first through fourth aspects, the other uplink transmissions include at least one of an SRS, a PUCCH communication, or a PUSCH transmission.

In a sixth aspect, alone or in combination with one or more of the first through fifth aspects, the first transmit power is higher than the second transmit power.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on."

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, or the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. A method of wireless communication performed by an apparatus of a user equipment (UE), comprising:
   determining a first transmit power for transmission of a preamble of a random access message based at least in part on one or more carriers,
      wherein the one or more carriers are to transmit the preamble or a payload of the random access message, and
      wherein a priority of one or more of the preamble or the payload is associated with the one or more carriers;
   determining a second transmit power for transmission of the payload associated with the one or more carriers,
      wherein the payload includes a physical uplink shared channel (PUSCH) communication, and
      wherein the random access message includes both the preamble and the payload;

transmitting the preamble using the first transmit power; and transmitting the payload using the second transmit power,
wherein the first transmit power and the second transmit power are associated with a transmission prioritization used to accommodate a power constraint, and
wherein transmitting the preamble using the first transmit power is prioritized over other uplink transmissions that overlap with the preamble.

2. The method of claim 1, wherein the first transmit power is determined based at least in part on a first set of parameters,
wherein the second transmit power is determined based at least in part on a second set of parameters, and
wherein the first set of parameters is different from the second set of parameters.

3. The method of claim 2, wherein the first set of parameters includes at least one of:
a transmission occasion in which the preamble is to be transmitted,
a pathloss measurement for a carrier to be used to transmit the preamble,
a transmission bandwidth assigned for transmission of the preamble,
a power spectral density target for transmission of the preamble, or
a pathloss compensation factor for transmission of the preamble.

4. The method of claim 2, wherein the second set of parameters includes at least one of:
a transmission occasion in which the payload is to be transmitted,
a pathloss measurement for a carrier to be used to transmit the payload,
a transmission bandwidth assigned for transmission of the payload,
a power spectral density target for transmission of the payload, or
a pathloss compensation factor for transmission of the payload.

5. The method of claim 1, wherein at least one of the first transmit power or the second transmit power is prioritized over a transmit power used for the other uplink transmissions,
wherein the other uplink transmission overlap with the preamble or the payload.

6. The method of claim 5, wherein the other uplink transmissions include a physical uplink control channel (PUCCH) communication.

7. The method of claim 5, wherein the other uplink transmissions include a PUSCH transmission.

8. The method of claim 1, wherein the preamble and the payload are transmitted using a same carrier.

9. An apparatus for wireless communication, comprising:
a memory; and
one or more processors coupled to the memory, the one or more processors configured to:
determine a first transmit power for transmission of a preamble of a random access message based at least in part on one or more carriers,
wherein the one or more carriers are to transmit the preamble or a payload of the random access message, and
wherein a priority of one or more of the preamble or the payload is associated with the one or more carriers;
determine a second transmit power for transmission of the payload associated with the one or more carriers,
wherein the payload includes a physical uplink shared channel (PUSCH) communication, and
wherein the random access message includes both the preamble and the payload;
transmit the preamble using the first transmit power; and
transmit the payload using the second transmit power,
wherein the first transmit power and the second transmit power are associated with a transmission prioritization used to accommodate a power constraint, and
wherein transmitting the preamble using the first transmit power is prioritized over other uplink transmission that overlap with the preamble.

10. The apparatus of claim 9, wherein the first transmit power is determined based at least in part on a first set of parameters,
wherein the second transmit power is determined based at least in part on a second set of parameters, and
wherein the first set of parameters is different from the second set of parameters.

11. The apparatus of claim 10, wherein the first set of parameters includes at least one of:
a transmission occasion in which the preamble is to be transmitted,
a pathloss measurement for a carrier to be used to transmit the preamble,
a transmission bandwidth assigned for transmission of the preamble,
a power spectral density target for transmission of the preamble, or
a pathloss compensation factor for transmission of the preamble.

12. The apparatus of claim 10, wherein the second set of parameters includes at least one of:
a transmission occasion in which the payload is to be transmitted,
a pathloss measurement for a carrier to be used to transmit the payload,
a transmission bandwidth assigned for transmission of the payload,
a power spectral density target for transmission of the payload, or
a pathloss compensation factor for transmission of the payload.

13. The apparatus of claim 9, wherein at least one of the first transmit power or the second transmit power is prioritized over a transmit power used for the other uplink transmissions,
wherein the other uplink transmissions overlap with the preamble or the payload.

14. The apparatus of claim 13, wherein the other uplink transmissions include a physical uplink control channel (PUCCH) communication.

15. The apparatus of claim 13, wherein the other uplink transmissions include a PUSCH transmission.

16. The apparatus of claim 9, wherein the random access message is a first message of a two-step random access procedure that includes both the preamble and the payload.

17. The apparatus of claim 9, wherein the preamble and the payload are transmitted using a same carrier.

18. A method of wireless communication performed by an apparatus of a user equipment (UE), comprising:

determining a first transmit power for transmission of a preamble of a random access message based at least in part on a first set of parameters,
  wherein the first set of parameters, associated with the determining the first transmit power for transmission of the preamble, includes a carrier to transmit the preamble and a payload of the random access message;
determining a second transmit power for transmission of the payload associated with a second set of parameters,
  wherein the random access message includes both the preamble and the payload, and
  wherein the second set of parameters, associated with the determining the second transmit power for transmission of the payload, includes the carrier;
transmitting the preamble using the first transmit power; and
transmitting the payload using the second transmit power.

19. The method of claim 18, wherein the first set of parameters is different from the second set of parameters.

20. The method of claim 18, wherein the first set of parameters further includes at least one of:
  a transmission occasion in which the preamble is to be transmitted,
  a pathloss measurement for the carrier,
  a transmission bandwidth assigned for transmission of the preamble,
  a power spectral density target for transmission of the preamble, or
  a pathloss compensation factor for transmission of the preamble.

21. The method of claim 18, wherein the second set of parameters further includes at least one of:
  a transmission occasion in which the payload is to be transmitted,
  a pathloss measurement for the carrier,
  a transmission bandwidth assigned for transmission of the payload,
  a power spectral density target for transmission of the payload, or
  a pathloss compensation factor for transmission of the payload.

22. The method of claim 18, wherein at least one of the first transmit power or the second transmit power is prioritized over a transmit power used for other uplink transmissions that overlap with the preamble or the payload.

23. An apparatus for wireless communication, comprising:
  a memory; and
  one or more processors coupled to the memory, the one or more processors configured to:
    determine a first transmit power for transmission of a preamble of a random access message based at least in part on a first set of parameters,
      wherein the first set of parameters, associated with the determining the first transmit power for transmission of the preamble, includes a carrier to transmit the preamble and a payload of the random access message;
    determine a second transmit power for transmission of the payload associated with a second set of parameters,
      wherein the random access message includes both the preamble and the payload, and
      wherein the second set of parameters, associated with the determining the second transmit power for transmission of the payload, includes the carrier;
    transmit the preamble using the first transmit power; and
    transmit the payload using the second transmit power.

24. The apparatus of claim 23, wherein the first set of parameters is different from the second set of parameters.

25. The apparatus of claim 23, wherein the first set of parameters further includes at least one of:
  a transmission occasion in which the preamble is to be transmitted,
  a pathloss measurement for the carrier,
  a transmission bandwidth assigned for transmission of the preamble,
  a power spectral density target for transmission of the preamble, or
  a pathloss compensation factor for transmission of the preamble.

26. The apparatus of claim 23, wherein the second set of parameters further includes at least one of:
  a transmission occasion in which the payload is to be transmitted,
  a pathloss measurement for the carrier,
  a transmission bandwidth assigned for transmission of the payload,
  a power spectral density target for transmission of the payload, or
  a pathloss compensation factor for transmission of the payload.

27. The apparatus of claim 23, wherein at least one of the first transmit power or the second transmit power is prioritized over a transmit power used for other uplink transmissions that overlap with the preamble or the payload.

28. The apparatus of claim 27, wherein the other uplink transmissions include a sounding reference signal (SRS).

29. The apparatus of claim 23, wherein the random access message is a first message of a two-step random access procedure,
  wherein the first set of parameters further includes an index of transmission occasion for the first message of the two-step random access procedure, and
  wherein the second set of parameters further includes the index of transmission occasion for the first message of the two-step random access procedure.

30. The apparatus of claim 23, wherein the first transmit power and the second transmit power are associated with a transmission prioritization used to accommodate a power constraint when the apparatus is operating in a supplemental uplink mode.

* * * * *